US012440845B2

(12) United States Patent
Deckler

(10) Patent No.: US 12,440,845 B2
(45) Date of Patent: Oct. 14, 2025

(54) BLOOD COLLECTION TUBE

(71) Applicant: Elizabeth Deckler, Miami, FL (US)

(72) Inventor: Elizabeth Deckler, Miami, FL (US)

(73) Assignee: Elizabeth Deckler, New York, NY (US)

(*) Notice: Subject to any disclaimer, the term of this patent is extended or adjusted under 35 U.S.C. 154(b) by 321 days.

(21) Appl. No.: 17/732,452

(22) Filed: Apr. 28, 2022

(65) Prior Publication Data

US 2023/0347350 A1 Nov. 2, 2023

(51) Int. Cl.
*B01L 3/00* (2006.01)

(52) U.S. Cl.
CPC ....... *B01L 3/50825* (2013.01); *B01L 2200/16* (2013.01); *B01L 2300/044* (2013.01); *B01L 2300/0681* (2013.01); *B01L 2300/1883* (2013.01); *B01L 2400/049* (2013.01)

(58) Field of Classification Search
CPC ............. B01L 3/50825; B01L 2200/16; B01L 2300/044; B01L 2300/0681; B01L 2300/1883; B01L 2400/049
See application file for complete search history.

(56) References Cited

U.S. PATENT DOCUMENTS 1,513,360 A 10/1924 Eleeza
2,460,641 A 2/1949 Kleiner
3,610,369 A 10/1971 Rodgers
3,825,013 A 7/1974 Craven
3,898,046 A * 8/1975 Ikeda .................. B01L 3/50825 422/550
4,153,739 A 5/1979 Kessler
4,492,634 A 1/1985 Anthony-Euclid
4,856,533 A * 8/1989 Anraku .................. A61L 31/10 600/576
4,881,915 A 11/1989 Liaw
5,320,812 A 6/1994 Harper
(Continued)

FOREIGN PATENT DOCUMENTS

WO WO-20201504860 A1 * 7/2020 ............. A61B 5/155
WO WO-2021150399 A1 * 7/2021 ............. A61B 5/154

OTHER PUBLICATIONS

Dorin Harpaz, Dissolvable Polyvinyl-Alcohol Film, a Time-Barrier to Modulate Sample Flow in a 3D-Printed Holder for Capillary Flow Paper Diagnostics, journal, Jan. 22, 2019, 12-3, Materials (Basel), Switzerland.

*Primary Examiner* — Jill A Warden
*Assistant Examiner* — Michael Stanley Gzybowski

(57) ABSTRACT

A blood collection apparatus comprising: a test tube element for storing blood extracted from a patient, the test tube element comprising a vacuum facilitating an extraction of the blood, and comprising a test tube septum; an additive, within the test tube element, and beings encased by a soluble film, wherein exposure of the soluble film to the extracted blood dissolves the soluble film, whereby the additive is only available to react with the blood extracted from a patient after the soluble film has been dissolved; and an additive blocking element incorporated into the test tube septum, wherein the additive blocking element blocks the extracted blood from dissolving a portion of the soluble film and thereby limiting the amount of additive applied to the extracted blood, limiting the free surface of the blood thereby limiting the sloshing of the extracted blood within the test tube.

7 Claims, 13 Drawing Sheets

(56) References Cited

U.S. PATENT DOCUMENTS

| | | | |
|---|---|---|---|
| 5,326,535 | A | 7/1994 | Vogler |
| 5,344,611 | A | 9/1994 | Vogler et al. |
| 5,379,898 | A | 1/1995 | Joulia |
| 5,779,092 | A | 7/1998 | Hehn |
| 5,879,635 | A | 3/1999 | Nason |
| 6,220,287 | B1 | 4/2001 | Wolf |
| 6,438,965 | B1 | 8/2002 | Liao |
| 6,467,299 | B1 | 10/2002 | Coetzee |
| 6,765,164 | B2 | 7/2004 | Lee |
| 6,971,506 | B2 | 12/2005 | Hassinen |
| 7,632,315 | B2 | 12/2009 | Egilsson |
| 8,550,737 | B2 | 10/2013 | Ruiz |
| 10,017,316 | B2 | 7/2018 | May |
| 10,723,538 | B2 | 7/2020 | Reid |
| 2002/0012563 | A1 | 1/2002 | May |
| 2007/0125677 | A1 | 6/2007 | Oronsky |
| 2010/0251731 | A1 | 10/2010 | Bergida |
| 2010/0254859 | A1 | 10/2010 | Chiarin |
| 2015/0253057 | A1 | 9/2015 | Leavitt |
| 2017/0122645 | A1 | 5/2017 | Berardino |

* cited by examiner

BLOOD COLLECTION TUBE

BACKGROUND OF THE INVENTIONS

1. Field of the Inventions

This disclosure relates to a blood collection tube. More specifically, this disclosure relates to apparatuses for and methods of improving the collection and transport of blood samples.

2. Description of the Related Art

Common blood tests drawn to, for example, measure blood lactate levels to evaluate for sepsis, require immediately placing the blood collection tube, with the drawn blood, in an ice slurry. Similarly, blood and plasma analysis of catecholamines, metanephrines, pyruvate, lactic acid, angiotensin converting enzyme, ACTH, acetone, free fatty acids, renin activity, and vasoactive peptide all require that the drawn blood sample in the test tube be chilled. By contrast, blood drawn for cryoglobulin analysis requires the sample carrying test tube be placed on a heating block. Delayed or omitted temperature control of blood samples can alter the results of analyses.

The current method of immersing the test tube in an ice slurry is inexcusably time-intensive and prone to error. The current practice involves a nurse, phlebotomist, or other healthcare worker to painstakingly gather a container of ice, draw the patient's blood, and then place the test tube in the ice bath. Nurses typically take care of several patients at a time, and in an ICU setting where the blood lactate is often assessed, the time they spend gathering an ice bath could be better spent tending to the needs of other ill patients. Additionally, placing the samples in an ice bath may not lead to correct results. Ice baths can result in incorrect analyses by the laboratory.

U.S. Patent Application Publication No. 20100254859A1 of Chiarin published on Feb. 21, 2012 discloses a test tube made of plastic designed for taking blood samples. U.S. Patent Application Publication No. 20070125677A1 of Oronsky published on Jun. 7, 2007 discloses a thermal and/or light protective container assembly. U.S. Pat. No. 6,971,506B2 issued to Hassinen on Dec. 6, 2005 discloses a test tube carrier that assists with transport of a test tube. U.S. Pat. No. 6,467,299 issued to Coetzee on Oct. 22, 2002 is a container for a vial or ampoule designed to maintain a desired temperature. These references do not effectively address the temperature control requirements of blood samples. The process of collecting blood and placing it on ice for transport has been in place for decades. The industry has not recognized the need for more efficient transport of these blood specimens, and no prior art known to the applicant has been developed to accommodate this need.

Hemolyzed samples can be considered inaccurate and not viable for lab analyses. The cost to the healthcare system of a hemolyzed sample is not limited to the price of a repeated blood test. A hemolyzed blood sample is first drawn, transported to the lab, and then discovered to be unusable once processing begins. The patient's blood must then be redrawn and a new sample transported and processed, leading to delays in patient care. This delay can beboth dangerous and costly, especially in emergency department and intensive care settings where time is limited.

U.S. Pat. No. 4,492,634 of Anthony-Euclid published on Jan. 8, 1985 discloses a test tube with a rubber stopper on both ends of the cylindrical apparatus and a baffle designed to prevent hemolysis upon the blood's entry into the tube. World Patent Application Publication No. WO2020150486A1 of Ma published on Jul. 23, 2020 discloses a blood collection device with a baffle and baffle chamber intended to counteract a vacuum within a blood collection tube when pierced by a needle. It reduces the vacuum pressures within the blood collection sample when the blood is initially drawn. World Patent Application No. WO2021150399A1 issued to Burkholz on Jul. 29, 2021 discloses an adapter that can be configured to couple to a catheter assembly. The adapter is designed to decrease the shear that red blood cells endure during initial blood collection. These references do not effectively address the breakdown of red blood cells in blood samples.

Additives are often included in test tubes. They serve purposes such as preventing coagulation, promoting coagulation, and inhibiting glycolysis. Examples of additives include sodium fluoride, sodium heparin, EDTA, and sodium citrate. Additives are placed in test tubes by the manufacturer, prior to blood being drawn into the test tube. The manufacturer includes an amount of additive, such as EDTA and citrate, based on the assumption that the tube will be completely, or almost completely, filled with blood. The amount of additive is carefully calculated to create a certain additive-to-blood ratio. However, in practice, the test tube is not always filled with the prescribed amount of blood. Some conditions such as dehydration cause a decreased blood volume and increased difficulty drawing enough blood to fill test tubes. In test tubes containing a citrate additive, blood must be drawn to fill at least ninety percent of the tube's stated volume. If the tube is underfilled, the coagulation analyses on the blood can be impacted and the patient may receive an incorrect dosage of anticoagulant based on the results.

U.S. Pat. No. 5,320,812 issued to Harper on Jun. 14, 1994 which discloses a blood collection system that contains a clot activating polyelectrolyte complex, U.S. Pat. No. 5,344,611 issued to Wang on Sep. 17, 2013 which discloses a specimen collection container that assists with the stabilization of blood pH during sample storage, U.S. Pat. No. 4,153,739 issued to Kessler on May 8, 1979 discloses a method of maintaining the blood clot-activating properties of a siliceous surface in a blood collecting assembly, and U.S. Pat. No. 5,326,535 issued to Vogler on Jul. 5, 1994 which discloses a tube that has an interior coating of unitarily immobilized clotting activator. These disclosures of test tubes containing additives do not incorporate the mechanism to self-adjust the ratio of additive to blood within the test tube based on the volume of blood in the tube by blocking the interaction between blood and additive.

BRIEF SUMMARY OF THE INVENTIONS

The blood collection tube embodiments disclosed herein advantageously solve the shortcomings inherent in the prior art methods of obtaining and analyzing lab tests that require the sample of blood to be cooled or heated. An embodiment of the disclosed blood collection tubes comprises a test tube for storing blood extracted from a patient, and a heat transfer element encapsulating the test tube and storing at least two reagents capable of initiating a heat transfer process contemporaneously with the extraction of the blood from the patient. The heat transfer element further comprising a fracturable element that when fractured enables the at least two reagents to initiate the heat transfer process. In certain embodiments, the blood collection tubes further comprise an insulation element encapsulating the heat transfer element, the insulation element inhibiting the loss of a temperature change of the blood.

Advantageously, with the use of the disclosed blood collection tubes, lab tests will be more accurate and less time-intensive to collect. The blood will be immediately drawn into a tube at the desired temperature. Eliminating the time spent gathering cooling or heating materials prior to drawing blood could save the health system a significant amount of time and money. More accurate lab tests will result in fewer unnecessary tests, hospital days, and procedures. The blood collection tube will also decrease the risk of misdiagnosis.

Advantageously, the presently disclosed embodiments are designed to enhance the standard of care. Current methods of drawing blood from a patient utilize a blood collection tube that does not comprise a heat transfer process to either cool or warm the blood as it is drawn into a test tube. Prior art test tubes and vacuum tubes, such as manufactured by Becton, Dickinson and Company, do not incorporate the capability for an endothermic or exothermic process to cool or warm the blood as it enters the test tube.

Hemolyzed blood samples are a major issue faced by hospitals and outpatient lab services. Hemolysis is the phenomenon of red blood cells being ruptured or otherwise destroyed, causing hemoglobin to be released. Hemolysis can occur in the body, known as in vivo, due to certain medical conditions. More commonly, hemolysis occurs outside the body, known as in vitro, due to destruction that takes place during blood collection, transport, and processing.

Current methods of drawing and housing blood from a patient utilize a blood collection tube that does not comprise a mechanism for reducing the sloshing of the blood within the apparatus after the initial drawing of the blood. Prior art test tubes and vacuum tubes do not incorporate the capability for dampening the slosh of the blood within the tubes after the blood has been collected into the tube.

The present embodiments of the blood collection tube advantageously solve the shortcomings inherent in the current method of collecting and transporting blood samples. An embodiment of the disclosed blood collection tube comprises a test tube for storing blood extracted from a patient. The test tube, comprising a vacuum facilitating an extraction of blood from the patient, further comprises a slosh dampening element. Another embodiment of the blood collection tube incorporates a space-occupying element intended to reduce the sloshing of the fluid within the test tube by reducing the free surface of the blood.

Advantageously, one or more elements of the disclosed device are designed to decrease the incidence of in vitro hemolysis in blood samples. Sloshing of blood within a test tube, especially test tubes that are not completely filled, can cause hemolysis. Dampening of the slosh of the blood contained in the test tube will improve this outcome. Minimizing the free surface of the fluid contained in the test tube will also improve this outcome by removing the free surface of the fluid, rendering it unable to slosh. Advantageously, with the use of the disclosed blood collection tubes, delays in patient care due to repeated blood draws will be decreased. The costs to patients and healthcare entities associated with hemolyzed blood samples will be lessened. In-vitro hemolysis of blood samples during transport has been an issue impacting the healthcare system for decades; however, until the disclosed apparatus, a solution to the issue had not been recognized. No prior art exists that intends to solve the issue of in vitro hemolysis by decreasing the sloshing of the blood after blood collection has taken place. While the expectation might be that the blood collection test tube is completely filled with the drawn blood, in practice, blood collection tubes are often partially filled by blood following collection. The industry has not recognized the need for an anti-sloshing mechanism within test tubes to reduce sloshing after the blood has been drawn into the tube, and no prior art has been developed to accommodate this need.

Advantageously, one or more aspects of the disclosed device are designed to decrease the incidence of incorrect blood analyses due to underfilling of the test tube. The blood collection tube solves the issue of incorrect blood analyses secondary to underfilled test tubes by dispersing the additive along the inner walls of the test tube in an arrangement that allows for the correct amount of additive to interact with blood based on the volume of blood in the tube. As the volume of blood in the tube increases and blood rises along the walls of the test tube, more additive is available to interact with the blood. The additive is encased in a dissolvable film composed primarily of a water-soluble polymer. The thickness, molecular weight, and degree of hydrolyzation of the dissolvable film controls how quickly the film dissolves and allows the blood to interact with the additive. To prevent the additive on the top of the test tube from dissolving due to blood flowing over it, that portion can be made thicker or of a different composition. To prevent blood from moving and interacting with additive above its stationary volume level, an additive blocking mechanism, such as an extension of the test tube septum, moves towards the surface of the blood and blocks the blood from interacting with the additive on the inner walls of the test tube. After the blood is collected and the additive blocking mechanism is deployed, the practitioner can invert the test tube, as is common practice, to be sure that the blood within the tube has interacted with all of the intended additive.

Advantageously, an enhanced blood collection test tube synergistically combines one or more of the herein disclosed of the disclosed temperature control elements, a hemolysis attenuation elements, and additive ratio elements. For example, regulation of the temperature and the sloshing of the blood decreases the risk of hemolysis, and inhibiting the alteration of the additive to blood ratio improves the accuracy of analyses of the blood sample. A synergistic relationship between the temperature element, the hemolysis attenuation element, and the additive ratio element decrease the risk of blood samples providing incorrect analyses.

DETAILED DESCRIPTION OF THE INVENTIONS

Figure 1:
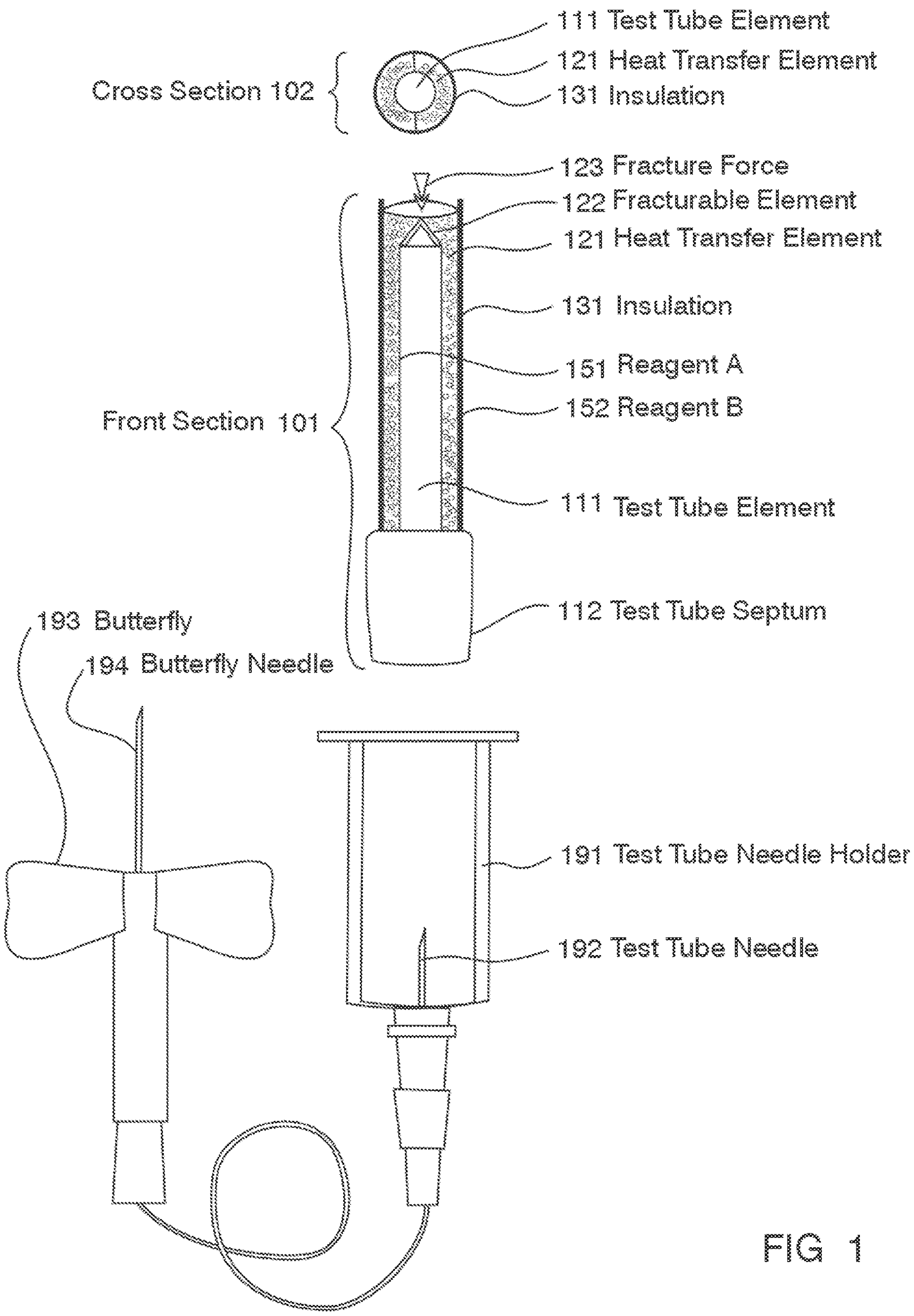
FIG. 1 is a front section view and a cross-section view of a blood collection tube shown in combination with a general-purpose test tube needle holder, the apparatus comprising a test tube element and a heat transfer element, wherein the perimeter of the heat transfer element provides insulation, wherein the heat transfer element further comprises a fracturable element that is fractured with the application of a fracture force to enable at least two reagents to initiate an endothermic or exothermic process.

For purposes of the present disclosure, various terms used in the art are defined as follows:

The term "exemplary" shall mean "serving as an example, instance, or illustration." Any aspect or embodiment described herein as "exemplary" is not necessarily to be construed as preferred or advantageous over other aspects or embodiments described herein.

The term "herein" shall mean in the entirety of this specification including drawings, abstract, and claims. The term herein is not limited to the paragraph, section, or embodiment in which it may appear.

The terms "include", "comprise", and "contains" do not limit the elements to those recited. By contrast, only the term "consist" limits the elements to those listed. Unless specifically stated otherwise, the term "some" refers to one or more.

The term "responsive" does not limit the elements, conditions, and/or requirements that may be taken into consideration. For example, an element or structure that is responsive to a specified requirement is not limited to being responsive to only that specified requirement. An element or structure may be responsive to a specified requirement and a second non-specified requirement, specially, when the second requirement, while described as an alternative requirement, may be also deemed complementary.

No conceptual distinction should be drawn from the use of the terms on, at, or in.

The term "adjacent" shall mean next to, encasing, housing, interacting with, or in close proximity of.

The terms "apparatus", "device", "instrument", and "assembly" may be used herein interchangeably and are not intended to limit the scope of the disclosure.

The term "attenuate" shall mean to decrease the incidence or presence of "Attenuate" shall also mean to become weaker in strength, magnitude, or value. "Attenuate" shall also mean to rarify.

The term "ampoule" shall mean a small vessel, container, capsule, and the like in which a substance, such as a reagent, is sealed, and capable of being fractured, broken, or cracked to release the substance The term "baffle" shall mean a structure, material, or matter that has the ability to decrease the sloshing of a fluid.

The term "block" shall mean to create an obstacle. The term "block" shall also mean to prevent the interaction of or access to.

The term "blood" shall mean blood, plasma, bodily fluid, and or other substance extractable from a patient.

The term "blood test" shall mean test or procedure, such as a complete blood count, ammonia level, or comprehensive metabolic panel that is undertaken substantially after the extraction of blood from a patient into a test tube.

The term "bottom" when referring to the test tube shall mean the aspect of the test tube furthest from the test tube septum.

The term "button" shall mean an apparatus, which can be pressed, depressed, pushed, clicked, or activated that controls a mechanism or process.

The term "chemical process" shall mean a process or reaction that leads to the chemical transformation of one set of chemical substances to another and may be used interchangeably with the term "chemical reaction".

The term "element" shall mean an element, component, piece, part, section, and module. The terms "element", "component", "piece", "part", "section", and "module" may be used herein interchangeably and are not intended to limit the scope of the disclosure.

The term "encapsulating" shall mean substantially, but not necessarily entirely, encapsulating, enclosing, surrounding, and covering.

The term "movement" shall mean the act of changing physical location or position.

The term "foam" shall mean a substance comprised of air or gas trapped in a solid or liquid.

The term "free surface" shall mean the interface between the blood in a test tube and the space unoccupied by blood within the test tube.

The term "general-purpose" shall mean not specially adapted in function or design to be used in combination with a blood collection tube.

The term "heat transfer element" shall mean an element, capsule, chamber, compartment, and partitioned space.

The term "oscillation" shall mean the movement back and forth of a liquid surface due to excitation of the container the liquid is contained in. The term "oscillation" can be used interchangeably with "inertial oscillation" and "inertial wave."

The term "insulation" shall mean a material, substance, coating, and mass used to inhibit a heat transfer.

The term "needle" shall mean a hollow needle used to inject substances into a patient or extract blood from the patient. A needle may be an element of a butterfly needle, a component part of a test tube needle holder, and a pointed hollow end of a hypodermic syringe or instrument used to extract blood.

The term "occupying" shall mean to take up a place or exist in space.

The term "patient" shall mean a human, animal, and object from which blood may be extracted.

The term "ratio" shall mean a relationship between two quantitative amounts.

The term "reagent" shall mean a substance or compound added to cause a chemical process or, in the case of a reactant, to be consumed in the course of a chemical process. A reagent herein comprises, for example, ammonium nitrate, barium hydroxide, urea, water, sodium acetate, iron, calcium chloride, magnesium sulfate, and ammonium chloride.

The term "space" shall mean an area or expanse that is free, available, or unoccupied such as a vacuum or empty container.

The term "substance" shall mean any matter and may be used interchangeably with the terms "chemical", "water", "liquid", and "matter".

The term "syringe" shall mean an instrument capable of drawing or extracting blood from a patient and ejecting blood into a blood chamber or test tube.

The term "top" when referring to the test tube shall mean the aspect of the test tube closest to the test tube septum.

The terms "test tube element" and "test tube" are interchangeable and shall mean a test tube, culture tube, sample tube, blood collection tube, vacuum tube, instrument, device capable of storing blood extracted from a patient, general-purpose test tube, and specially adapted test tube. The term "vacutainer" is a registered trademark of Becton, Dickinson & Company for a vacuum tube.

The term "test tube needle holder" shall mean a blood collection component used in conjunction with a vacuum tube. Examples of "test tube needle holders" include vacutainer holders and vacutainer hubs.

The term "test tube septum" shall mean a material that covers or seals the opening of a test tube and which may be puncturable. The term "test tube septum" shall also mean a test tube rubber stopper, test tube snap-top, and test tube hinge cap.

The term "user" and "practitioner" are used interchangeably and shall mean a nurse, phlebotomist, respiratory therapist, doctor, physician assistant, machines, veterinarian, veterinary assistant, and other entities capable of extracting blood from a patient.

The term "vacuum" shall mean an enclosed space or chamber entirely devoid of matter, or from which matter, especially air, has been partially or entirely removed so that the matter or gas that may remain in the space exerts less pressure.

The term "vacuum tube" shall mean a blood collection test tube comprising a vacuum. A vacuum tube is usually a glass or plastic test tube with a rubber stopper sealing a vacuum inside of the tube and facilitating the drawing of a volume of blood.

The above defined terms and other terms explicitly defined herein are to be understood as defined in this document. Incorporation by reference shall not act to modify, limit, or broaden the definitions hereinabove provided or formally defined in this document. A term that is not formally defined in this document is defined herein to have its ordinary and customary meanings.

In the various embodiments disclosed herein, a blood collection tube comprises a test tube element and test tube septum. The test tube element is vacuum-sealed to assist with drawing blood into the tube. Disclosures of a test tube and the use of vacuum sealing, which are incorporated herein by reference in their entirety, include U.S. Pat. No. 1,513,360A issued to Eleeza on Oct. 28, 1924 which discloses a test tube that is used to contain materials from a clinical and bacteriological laboratory, U.S. Pat. No. 2,460,641 issued to Kleiner on Feb. 1, 1949 which discloses blood collecting apparatus that utilizes a vacuum mechanism to assist with drawing blood, U.S. Pat. No. 7,632,315B2 issued to Egilsson on Dec. 15, 2009 which discloses a method for creating a vacuum chamber, and U.S. Pat. No. 10,723,538B2 issued to Reid on Jul. 28, 2020 which discloses a method for vacuum-insulating materials.

In an alternative embodiment, the test tube element is empty. Alternatively, the test tube element need not include a vacuum. Multiple blood collection tubes may be produced to accommodate different test tube element dimensions and volumes (e.g., 1 mL, 1.8 mL, 2 mL, 2.5 mL, 2.7 mL, 3 mL, 3.5 mL, 4 mL, 4.5 mL, 5 mL, 6 mL, 7 mL, 8 mL, 8.5 mL, 9 mL, 9.5 mL, 10 mL).

Advantageously, certain embodiments of a blood collection tube further comprise a heat transfer element whose perimeter (i.e., outside wall, exterior surface, exterior material rather than its inner wall, interior surface, interior material) provides insulation. The insulation substantially helps retain the increased or decreased temperature within the heat transfer element and the test tube element. The insulation element also prevents a user's hands from being exposed to or affecting the varying temperatures of the device. The insulation can be sprayed or painted on, made a part of, or otherwise incorporated into, the perimeter of the heat transfer element.

In an alternate embodiment, insulation may be provided by the insulating material of the heat transfer element. In other words, the blood collection tube need not include insulation other than what may be provided by the material of the heat transfer element. However, since insulation in the inner wall, interior surface, or interior material of the heat transfer element is at cross purposes with the object of the heat transfer element (i.e., transfer heat to or from the test tube element), advantageously the material of the inner wall of the heat transfer element ought to promote a transfer of heat (i.e., a conducting material). N such embodiments the material of the perimeter would differ from the material of inner surface of the heat transfer element.

In another alternate embodiment, the blood collection tube further comprises an insulation element that encapsulates the heat transfer element. The insulation element utilizes or is composed of an insulator comprising, for example, a vacuum, rubber, plastic, acrylic, fiberglass, polyurethane, Styrofoam, cork, asbestos, thermoplastic, cellulose, polystyrene, wool, or other thermal insulating material. The insulation element may include a combination of or layers of a non-insulating material and/or an insulating material. The insulation element need not be composed of only one form of material.

Additionally, the insulation, insulator, and insulation element may comprise a light filter to protect the blood from the effects of light external to the blood collection tube.

The blood collection tube has a test tube septum. Advantageously, the test tube septum comprises an indicator of a heat transfer capability of the blood collection tube. The test tube septum is comprised of a material that covers or seals the opening of a test tube element and which may be puncturable. Advantageously, the test tube septum comprises an insulating material.

Conventionally, test tubes are sealed with a test tube septum and often have a specific additive placed in the tube with the test tube septum color indicating the additive. For example, a blue-top tube is a 5 ml test tube containing sodium citrate as an anticoagulant. Advantageously, the conventional color scheme implemented in a test tube septum is combined with a designation indicating the endothermic or exothermic capability of the blood collection tube. For example, in an endothermic capable blood collection tube, in addition to the appropriate additive color designation, a snowflake image is added. Alternatively, the heat transfer designation may be any color, combination of colors (e.g., stripping), and images (e.g., a snowflake, fire, spark, thermometer), logo, and/or suitable design.

Advantageously, the various embodiments disclosed herein comprise a blood collection tube that may be used in conjunction with a specifically adapted device or general-purpose devices such as a vacutainer hub, vacutainer holder, syringe, and other blood draw devices. Such general-purpose devices conventionally comprise a test tube needle holder, test tube needle, butterfly, and butterfly needle. The size of conventional vacutainer hubs, vacutainer needle holders, and syringes need not need to be changed to accommodate the blood collection tube. In the case of a specifically adapted device or a special-purpose device, such devices are responsive to the dimensional and heat transfer requirements of the blood collection tube.

The blood collection tube is also specially adapted to be used in conjunction with centrifuges and blood processing equipment. Conventional centrifuges and blood processing equipment need not be altered to accommodate the blood collection tube. Examples of commercially available test tube needle holders include the BD Vacutainer One-Use Holder, The BD Vacutainer One-Use Needle Holder, and the Vacutainer Hub, the teachings of which are incorporated herein by reference.

In chemistry, reactions that change temperature can be defined as either endothermic or exothermic. An endothermic process absorbs heat from its surroundings and an exothermic process releases heat into its surroundings. Heat is absorbed from the surroundings when chemical bonds are broken and heat is released into the surroundings when chemical bonds are formed. The amount of heat absorbed or released by a chemical reaction can be calculated using the equation $q=mc\,\Delta T$, where q is the amount of heat energy, c is the specific heat capacity of the solution, m is the mass of the solution, and $\Delta T$ is the temperature change. The change in temperature ($\Delta T$) is calculated by subtracting the initial temperature of the solution from the final temperature of the solution. The specific heat capacity of reagents and reactions are standard. The temperature change can be manipulated by altering the mass of the reactants.

Advantageously and innovatively, in the various embodiments disclosed herein, the blood collection tube comprises a heat transfer element that includes at least two reagents to initiate a chemical reaction (e.g., an endothermic process absorbing heat, or an exothermic process releasing heat). The heat transfer element, encapsulating the test tube element, absorbs heat from, or release heat to, the blood in the test tube element as the blood is drawn from the patient. The amount of each reagent is responsive to the amount of time the reaction is intended to stay at a certain temperature. Advantageously, the amount of each reagent is chosen based on the desired temperature of the reaction and the desired heat transfer of the heat transfer element. Disclosures of the use of an endothermic process for heat transfer, which are incorporated herein by reference in their entirety, include U.S. Patent Application Publication No. 20150253057A1 issued to Leavitt on Sep. 1, 2015 which discloses a cooling agent for cold packs and beverage containers. The cooling agent includes compounds such as potassium, nitrogen, ammonium phosphate, diammonium phosphate, ammonium polyphosphate, ammonium pyrophosphate, and ammonium metaphosphate, U.S. Patent Application Publication No. 20170122645A1 to Berardino on May 4, 2017 which discloses an instant cold pack apparatus that utilizes ammonium nitrate, urea, ammonium formate, U.S. Patent Application Publication No. 20100251731A1 issued to Bergida on Oct. 7, 2010 which discloses a self-chilling beverage can that utilizes an endothermic process and other chemicals to perform an endothermic process, and U.S. Pat. No. 6,438,965B1 issued to Liao on Aug. 27, 2002 which discloses an instant cold pack that comprises a water bag and a coolant consisting of ammonium, nitrate sodium carboxyl methyl cellulose, and sodium chloride.

The heat transfer element contains at least two reagents to produce an endothermic process or an exothermic process. In an endothermic process, the heat transfer element will absorb heat from the blood contained in the test tube element. Alternatively, in an exothermic process, the blood contained in the test tube will absorb heat from the heat transfer element. In some embodiments, the reagents mix, freeze, thaw, and refreeze to prolong the amount of time the system remains at a desired temperature. In some embodiments, the heat transfer element contains a substance or mechanism that causes a temperature change or allows for a temperature change, including a phase change material, wax, or other material that retains a desired temperature.

Additionally, or alternatively, the heat transfer element of the blood collection tube utilizes a heat transfer agent, e.g., a non-reagent-based cooling or heating element using, for example, ice, dry ice, cooling or heating gel that may promote maintaining a desired temperature. The term "heat transfer agent" shall mean a substance or mixture of substances that retain cold or hot temperatures. A heat transfer agent herein comprises, for example, polymers, polymers combined with water, water, aerogel, and phase change material. Certain embodiments of a blood collection tube utilizing a heat transfer agent would require bringing the blood collection tube to a desired temperature prior to its use. For example, in using water as the heat transfer agent, the blood collection tube would need to be cooled or frozen and maintained at that temperature prior to its use.

In some embodiments, the heat transfer element contains a heat transfer agent that maintains a certain temperature when cooled with a freezer or other form of cooling mechanism. Alternatively, the heat transfer element contains one or more partitions housing water or another substance. The partition of the heat transfer element may be a vacuum. The heat transfer element encapsulating the test tube element may be a chamber of the test tube element.

The blood collection tube comprising a heat transfer element encapsulating the test tube element and storing at least two reagents is thus capable of initiating an endothermic process contemporaneously with the extraction of the blood from the patient. The endothermic reaction is described by an equation q=mcAT, wherein “q” is a symbol for heat energy, “m” is a symbol for mass, “c” is a symbol for specific heat, and “ΔT” is a symbol for change in temperature.

Alternatively, the heat transfer element stores at least two reagents capable of initiating an exothermic process contemporaneously with the extraction of the blood from the patient. The exothermic reaction is described by an equation q=mcAT, wherein “q” is a symbol for heat energy, “m” is a symbol for mass, “c” is a symbol for specific heat, and “ΔT” is a symbol for change in temperature.

FIG. 1 is a front section view 101 and a cross section view 102 of a blood collection tube embodiment comprising a test tube element 111 and test tube septum 112. The test tube element 111 is vacuum sealed to assist with drawing blood into the tube. Advantageously, the test tube element 111 contains one or multiple additives to alter or improve the general quality or to counteract undesirable properties in the blood sample in a manner that is responsive to the contemplated blood test.

The blood collection tube of FIG. 1 further comprises a heat transfer element 121. The heat transfer element 121 contains one or more reagents (e.g., reagent A 151 and reagent B 152) to produce an endothermic process or an exothermic process. In an endothermic process, the heat transfer element 121 will absorb heat from the blood contained in the test tube element 111. Alternatively, in an exothermic process, the blood contained in the test tube 111 will absorb heat from the heat transfer element 121. The heat transfer element 121 further comprises a fracturable element 122 that is fractured with the application of a fracture force 123 enabling the at least two reagents to initiate the endothermic or exothermic process. The user of the blood collection tube applies a fracture force 123 to the fracture element 122. Fracture of the fracture element 122 allows at least two reagents (e.g., reagent A 151 and reagent B 152) to mix, initiating the heat transfer process. Examples of two reagents are ammonium nitrate and water.

The heat transfer element further comprises an insulation of its perimeter 131 that maintains the increased or decreased temperature within the heat transfer element 121 and the test tube element 111. Advantageously, the insulation 131 also prevents a user’s hands from being exposed to or affecting the varying temperatures of the device. The insulation 131 can be sprayed, painted, or otherwise incorporated into the outer wall of the heat transfer element 121. In one embodiment, the blood collection tube need not include insulation 131 other than what may be provided by the material of the heat transfer element 121. The insulation capability of the perimeter of the heat transfer element is shown in FIG. 1 as the bold line.

In the embodiment shown in FIG. 1, the fracturable element 122 is located at the bottom of the blood collection tube opposite the test tube septum 112 which is located on the top of the blood collection tube (the blood collection tube is illustrated upside down). Unintentional application of a fracture force 123 is inhibited by, for example, an extension of the wall of the insulation element 131. The fracturable element 122 separates the reagents in the heat transfer element 121.

For perspective, FIG. 1 also depicts a test tube needle holder 191, test tube needle 192, butterfly 193, and butterfly needle 194. The size of conventional vacutainer hubs, vacutainer needle holders, and syringes need not need to be changed to accommodate the blood collection tube. Conventional centrifuges and blood processing equipment need not be altered to accommodate the blood collection tube.

In an exemplary embodiment relating to FIG. 1 and the disclosure herein, a blood collection tube comprises: (i) a test tube element for storing blood extracted from a patient, the test tube element comprising a vacuum facilitating an extraction of blood from the patient, and further comprising a test tube septum, the test tube septum comprising an indicator of an endothermic capability of the blood collection tube; (ii) a heat transfer element encapsulating the test tube element and storing at least two reagents capable of initiating an endothermic process contemporaneously with the extraction of the blood from the patient, the endothermic reaction described by equation q=mcAT, wherein “q” is a symbol for heat energy, “m” is a symbol for mass, “c” is a symbol for specific heat, and “ΔT” is a symbol for change in temperature, said endothermic process absorbing heat from the blood in the test tube element, the heat transfer element further comprising a fracturable element that when fractured enables the at least two reagents to initiate the endothermic process; and (iii) wherein the heat transfer element comprises insulation inhibiting the loss of a temperature change of the blood resulting from the endothermic process initiated by the at least two reagents, wherein the insulation does not interfere with a fracturing of the fracturable element, and wherein the combination of the heat transfer element and test tube element comprises a circumference suitable to be mated with a general-purpose test tube needle holder.

The heat transfer element further comprises a fracturable element that separates and prevents the reagents from prematurely initiating the chemical reaction. When the fracturable element is fractured with the application of a fracture force, then at least two reagents initiate the endothermic or exothermic process. The user of the blood collection tube applies a fracture force to the fracture element. Examples of two reagents are ammonium nitrate and water. Reagents include chemicals, compounds, and materials that when mixed produce the desired endothermic or exothermic process.

Disclosures of the use of a fracturable element, which are incorporated herein by reference in their entirety, include U.S. Patent Application Publication No. US2002/0012563A1 issued to May on Nov. 4, 2003 which discloses a rupturable membrane between two chambers that fractures when pressure is applied to it, U.S. Pat. No. 8,550,737B2 issued to Ruiz on Oct. 8, 2013 which discloses an applicator for dispensing adhesive or sealant material. It utilizes a sharp cutter within the apparatus designed to break a frangible seal on a container containing the adhesive, U.S. Pat. No. 10,017,316B2 issued to May on Jul. 10, 2018 which discloses a container assembly that has two containers and the second container is rupturable by manipulation through the first container, and U.S. Pat. No. 5,879,635A issued to Nason on Mar. 9, 1999 which discloses a reagent dispenser that utilizes a deforming method in order to have two reagents mix. Examples of the commercial implementation of fracturable elements, the teachings of which are incorporated herein by reference, include Dermabond by Johnson and Johnson and Nozin antiseptic.

The fracturable element is composed of a material with a fracture strength that is responsive to the fracture of the fracturable element with a user's application of a fracture force. The fracturable element is composed of a brittle material such as chalk, glass, ceramic, or graphite. In some embodiments, the material covering the fracturable element is flexible to allow for a fracture force to be applied to the fracturable element. Alternatively, the material covering the fracturable element utilizes a button mechanism to apply the fracture force to the fracturable element. Disclosure of the use of a button mechanism, which is incorporated herein by reference in its entirety, includes U.S. Pat. No. 6,765,164B2 issued to Lee et al. on Jul. 20, 2004 which discloses a push button seated in the seat depression so as to be movable by a predetermined distance.

The fracturable element can be composed of a fracturable material. In an alternative embodiment, the fracturable element fractures by dissolving, melting, crumbling, collapsing, or splitting with applied force.

Advantageously, a colorant may be used to indicate the fracture of the fracturable element. The colorant will be activated upon mixture of the reagents separated by the fracturable element. In some embodiments, each of the reagents separated by the fracturable element will contain a colorant and the two colorants mix to form a distinct color. For example, one reagent may contain a yellow colorant and a second reagent may contain a blue colorant, and mixing of the two reagents following fracture of the fracturable element creates a green mixture. An indicator of the fracture of the fracturable element helps the user determine if the fracturable element has been effectively fractured. The indicator also allows the user to know if the fracturable element was fractured in transport or at a time prior to its intended use.

In some embodiments, the heat transfer element is comprised of multiple insulating materials.

Figure 2:
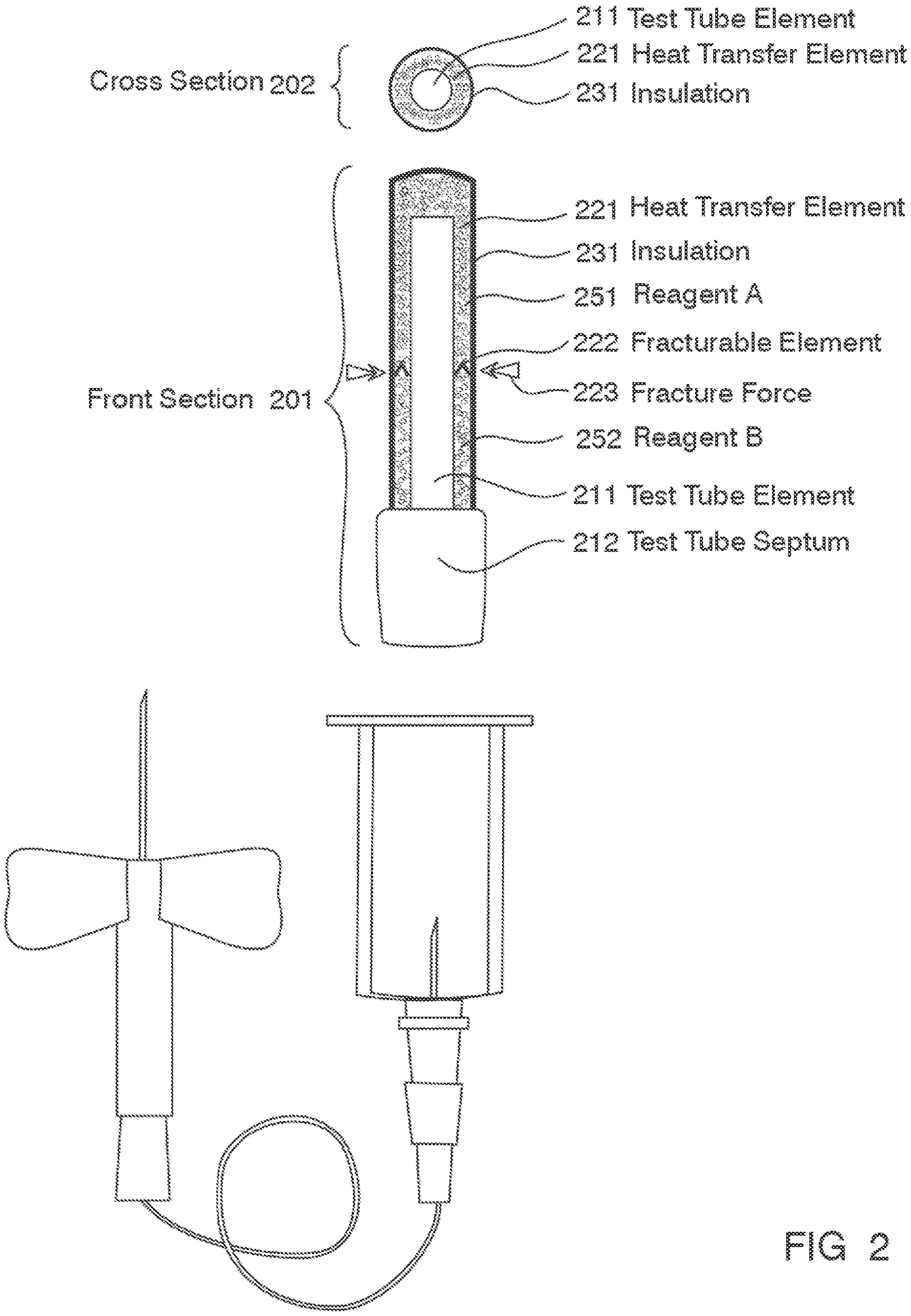
FIG. 2 is a front section view and a cross-section view of a blood collection tube comprising a test tube element and a heat transfer element, wherein the perimeter of the heat transfer element provides insulation, wherein the heat transfer element further comprises a fracturable element that is fractured with the application of a fracture force to enable at least two reagents to initiate an endothermic or exothermic process, and wherein a fracture force is applied on the side of the blood collection tube.

FIG. 2 is a front section view 201 and a cross section view 202 of a blood collection tube comprising a test tube element 211, a test tube septum 212, a heat transfer element 221, a fracturable element 222, a reagent A 251, and a reagent B 252. In this embodiment, a fracture force 223 is applied on the side of the blood collection tube to fracture the fracturable element 222.

In this embodiment, the heat transfer element 221 comprises an insulation 231, and is configured to accommodate the fracturable element 222 being located on the side of the blood collection tube. The fracturable element separates one or more reagents (e.g., reagent A 251 and reagent B 252). Similarly, the insulation 231 is configured to accommodate the fracturable element 222 being located on the side of the blood collection tube. The insulation 231 is flexible to allow for the fracture force 223 to fracture the fracturable element 222. Advantageously, the insulation 231 is a material that is both insulating and flexible, such as rubber, plastic, or other flexible insulating material. Alternatively, the entirety of the insulation 231 need not be flexible, partial flexibility or a push button implementation for that portion of the heat transfer element 121 necessary to accommodate the application of the fracture force 223 may be implemented.

Reagent A 251 and reagent B 252 are configured to accommodate the fracturable element 222 being located on the side of the collection apparatus. The fracture force 223 is applied to the side of the blood collection tube to fracture the fracturable element 222, causing reagent A 251 and reagent B 252 to mix, initiating a reaction.

Figure 3:
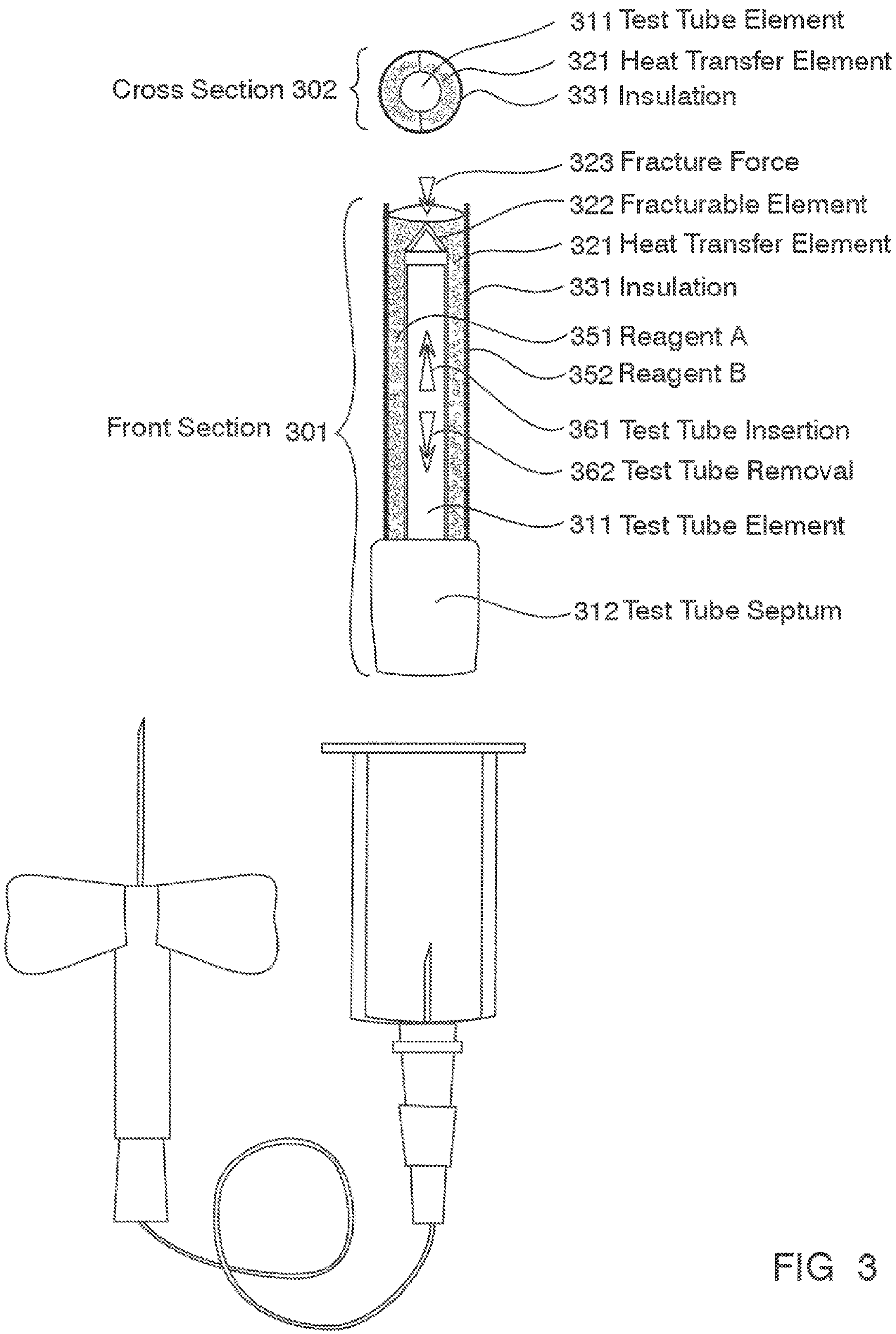
FIG. 3 is a front section view and a cross-section view of a blood collection tube comprising a test tube element and a heat transfer element, wherein the perimeter of the heat transfer element provides insulation, wherein the test tube element is a general-purpose test tube shown in combination with a general-purpose test-tube needle holder.

FIG. 3 is a front section view 301 and a cross section view 302 of a blood collection tube comprising a test tube element that is removable from the blood collection tube. In this embodiment, the test tube element 311 whether a general-purpose or specially adapted test tube element is independent from the heat transfer element 321. The test tube element 311 is removable from the blood collection tube at any point in the blood collection and analysis process. Optionally, the test tube element 311 may be kept within the blood collection tube throughout the blood collection and analysis process.

The test tube element 311 is inserted by, for example, a pushing or sliding force 361 into the heat transfer element 321. Similarly, the test tube element 311 is removed by, for example, a pulling or sliding force 362 away from the heat transfer element 321. In this embodiment, the structures of the test tube septum 312, heat transfer element 321, and insulation 331 are configured to enable the removal of the test tube element 311 from the heat transfer element 321.

As in FIG. 1, in the embodiment of FIG. 3, the fracturable element 322 is located on the top of the blood collection tube. However, both the fracturable element 322 and the heat transfer element 321 are modified as shown to compensate for the removable of the test tube element 311. The fracturable element 322 is fractured by a fracture force 323 to cause the reaction between the reagent A 351 and the reagent B 352.

In an exemplary embodiment relating to FIG. 3 and the disclosure herein, a blood collection tube comprises: (i) a test tube element for storing blood extracted from a patient, the test tube element comprising a vacuum facilitating an extraction of blood from the patient, and further comprising a test tube septum, the test tube septum comprising an indicator of an endothermic capability of the blood collection tube; (ii) a heat transfer element encapsulating the test tube element and storing at least two reagents capable of initiating an endothermic process contemporaneously with the extraction of the blood from the patient, said endothermic process absorbing heat from the blood in the test tube element, the heat transfer element further comprising a fracturable element that when fractured enables the at least two reagents to initiate the endothermic process; and (iii) wherein the heat transfer element comprises an insulation inhibiting the loss of a temperature change of the blood resulting from the endothermic process initiated by the at least two reagents, wherein the insulation does not interfere with a fracturing of the fracturable element, wherein the combination of the heat transfer element and the test tube element comprises a circumference suitable to be mated with a general-purpose test tube needle holder, and wherein the test tube element is removable from the heat transfer element contemporaneously with an initiation of a blood test.

Figure 4:
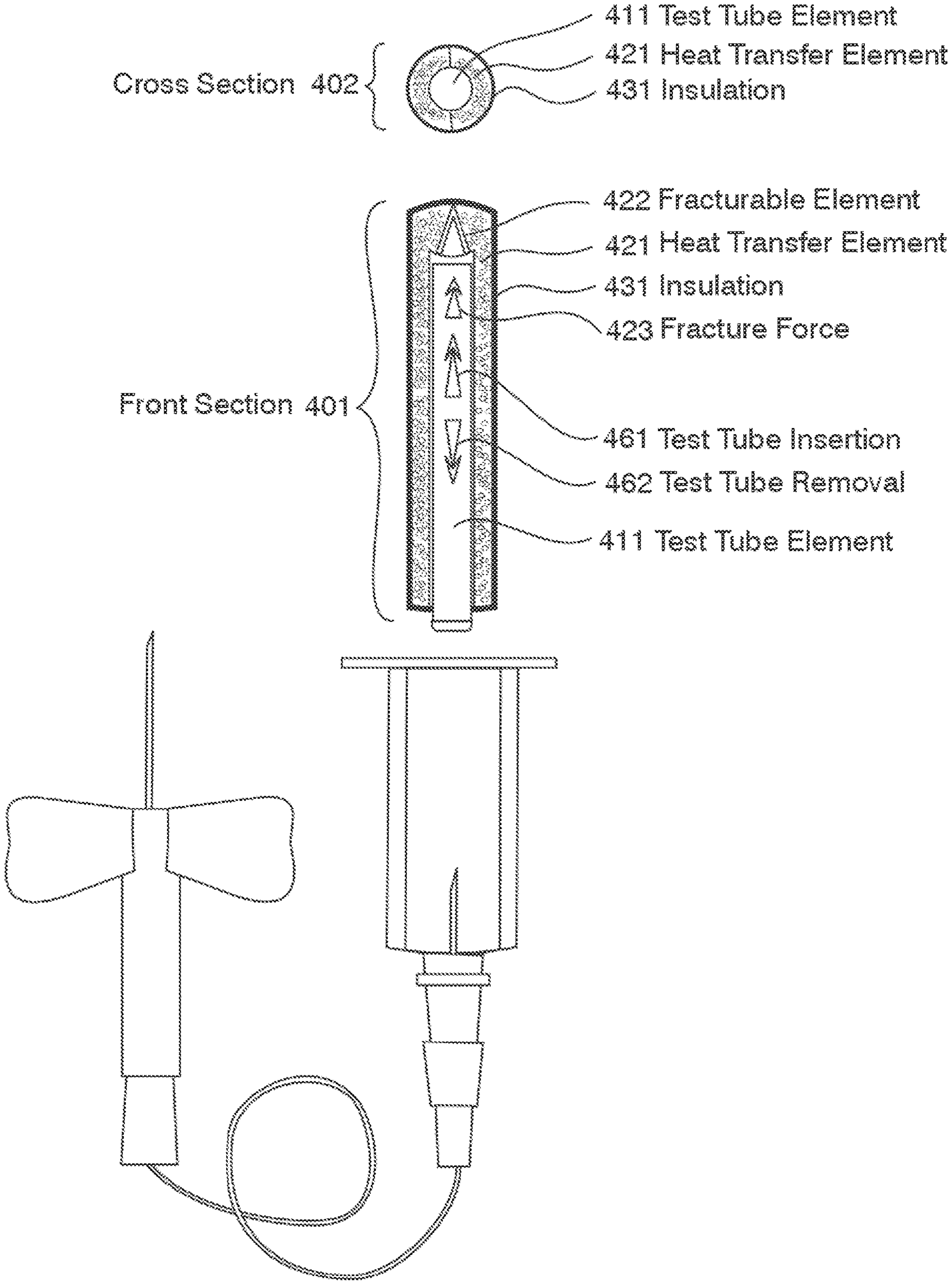
FIG. 4 is a front section view and a cross-section view of a blood collection tube comprising a test tube element and a heat transfer element, wherein the perimeter of the heat transfer element provides insulation, wherein the test tube element is a general-purpose test tube, and wherein a fracture force is applied by the insertion of the test tube into the blood collection tube.

FIG. 4 is a front section view 401 and a cross section view 402 of a blood collection tube comprising a test tube element that is removable from the blood collection tube. In the embodiment of FIG. 4, a fracture force 423 is applied to the modified fracturable element 422 by the insertion of the test tube element 411 into the blood collection tube. Advantageously, a general-purpose test-tube element (e.g., a test tube) or a specially adapted test tube element that are removable from the blood collection tube provide the necessary element to apply a fracture force 423 to the fracturable element 422.

The test tube element 411 is inserted by, for example, a pushing or sliding force 461 into the heat transfer element 421. Similarly, the test tube element 411 is removed by, for example, a pulling or sliding force 462 away from the heat transfer element 421.

In this embodiment, the structures of the test tube septum 412, heat transfer element 421, and insulation element 431 are configured to enable the removal of the test tube element 411 from the heat transfer element 421. Additionally, in this embodiment, the structure of the heat transfer element 421 and insulation 431 are compatible with a removable test tube element 411 and the use of the test tube element 411 to fracture the fracturable element 422.

Figure 5:
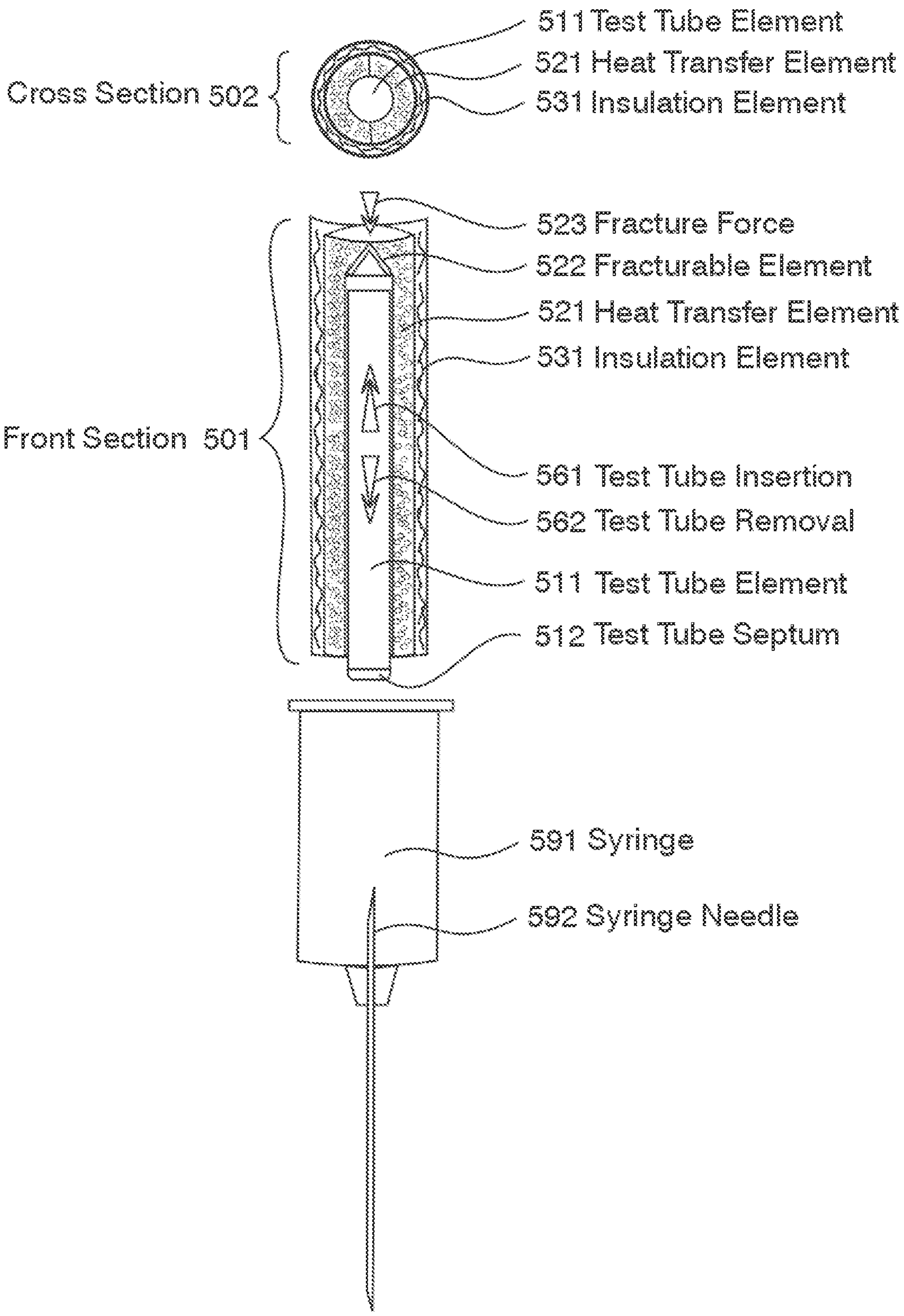
FIG. 5 is a front section view and a cross-section view of a blood collection tube comprising a test tube element, a heat transfer element, and an insulation element, shown in combination with a general-purpose syringe.

FIG. 5 is a front section view 501 and a cross section view 502 of a blood collection tube comprising a test tube element 511 that is removable from the blood collection tube. However, by contrast to the embodiment of FIG. 4, and similar to the embodiment of FIG. 1, the embodiment of FIG. 5 comprises a fracturable element 522 that is fractured with the application of a fracture force 523 external to blood collection tube which enables at least two reagents to initiate an endothermic or an exothermic process.

Advantageously, the embodiment of FIG. 5 further comprises an insulation element 531 that encapsulated the heat transfer element 521 and that provides an enhanced and more substantial level of insulation than what may or may not be provided by the perimeter of the heat transfer element 521. The insulation element 531 utilizes or is composed of an insulator comprising, for example, a vacuum, rubber, plastic, acrylic, fiberglass, polyurethane, Styrofoam, cork, asbestos, thermoplastic, cellulose, polystyrene, wool, or other thermal insulating material. The insulation element 531 may include a combination of or layers of a non-insulating material and/or an insulating material.

The structure of the insulation element 531 and the heat transfer element 521 while configured responsive to the fracturable element 522, may, although not necessarily, also accommodate a removable test tube element 511. On top of the fracturable element 522, the insulation element 531 may be composed of a flexible thermal insulation material. Alternatively, the required fracture force 523 may be applied to the fracturable element 522 by, for example, a flexible thermal insulation material such as rubber acting as a push button mechanism.

The test tube element 511 is inserted by, for example, a pushing or sliding force 561 into the heat transfer element 521. Similarly, the test tube element 511 is removed by, for example, a pulling or sliding force 562 away from the heat transfer element 521. In this embodiment, the structures of the test tube septum 512, heat transfer element 521, and insulation element 531 are configured to enable the removal of the test tube element 511 from the heat transfer element 521.

The embodiment of FIG. 5 is illustrated in combination with the use of a general-purpose syringe 591 and syringe needle 592. The syringe 591 and syringe needle 592 draw blood from the patient without the use of the butterfly needle or butterfly. Advantageously, in the embodiment of FIG. 5, the blood collection tube is dimensionally compatible with a general-purpose syringe 591. In such an embodiment, a general-purpose syringe need not be changed to accommodate the blood collection tube. Alternatively, a blood collection tube is mated with a special purpose syringe that specifically accommodates the dimensional and heat transfer requirements of the test tube element 511, heat transfer element 531, and insulation element 531.

In an exemplary embodiment relating to FIG. 5 and the disclosure herein, a blood collection tube comprises: (i) a test tube element for storing blood extracted from a patient, the test tube element comprising a vacuum facilitating an extraction of blood from the patient, and further comprising a test tube septum, the test tube septum comprising an indicator of an endothermic capability of the blood collection tube; (ii) a heat transfer element encapsulating the test tube element and storing at least two reagents capable of initiating an endothermic process contemporaneously with the extraction of the blood from the patient, said endothermic process absorbing heat from the blood in the test tube element, the heat transfer element further comprising a fracturable element that when fractured enables the at least two reagents to initiate the endothermic process; and (iii) an insulation element encapsulating the heat transfer element, the insulation element inhibiting the loss of a temperature change of the blood resulting from the endothermic process initiated by the at least two reagents; wherein the insulation element does not interfere with a fracturing of the fracturable element; wherein the insulation element includes an insulator selected from the group consisting of a vacuum, rubber, plastic, acrylic, fiberglass, polyurethane, Styrofoam, cork, asbestos, thermoplastic, cellulose, polystyrene, wool, and thermal insulating material; wherein the combination of the insulation element, heat transfer element, and test tube element comprises a circumference suitable to be mated with a general-purpose syringe; and wherein the test tube element is removable from the heat transfer element contemporaneously with an initiation of a blood test.

Figure 6:
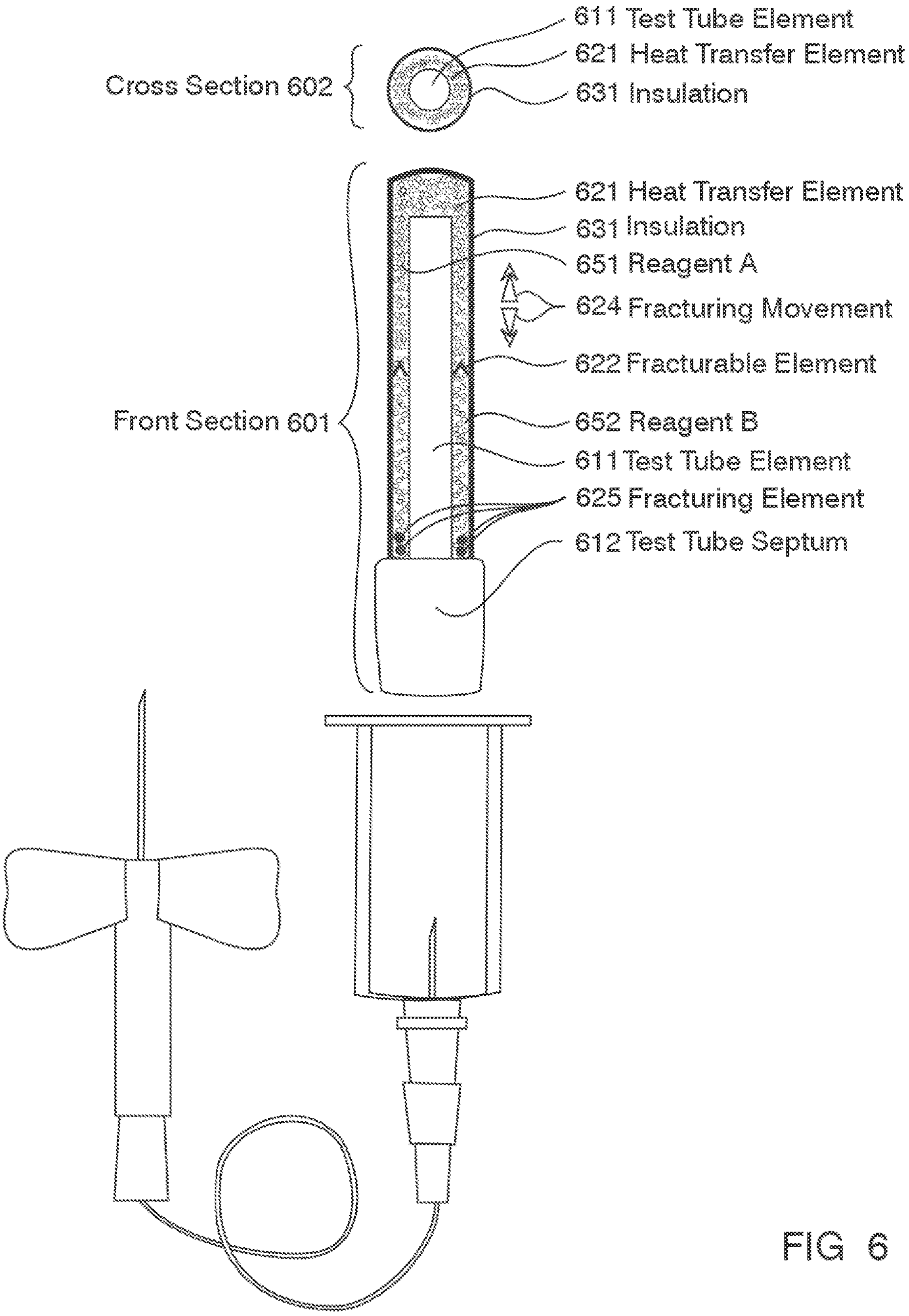
FIG. 6 is a front section view and a cross-section view of a blood collection tube comprising a test tube element and a heat transfer element, wherein the perimeter of the heat transfer element provides insulation, wherein a fracture movement is applied bidirectionally to cause a fracturing element to fracture the fracturable element.

FIG. 6 is a front section view 601 and a cross section view 602 of a blood collection tube comprising a test tube element 611, test tube septum 612, and heat transfer element 621 comprising insulation 631 wherein a fracturing movement 624 is applied bidirectionally to cause a fracturing element 625 to fracture the fracturable element 622.

The fracturable element 622 is located on the side of the blood collection tube. The fracturing element 625 may, although not necessarily, be spherical in shape and include multiple spherical elements. The fracturable element 625 may be located in any location within the heat transfer element 621. Advantageously, the fracturing element 625 serves to enable mixing the reagents and may be, as are other features and elements disclosed herein, used in combination with other fracturable elements detailed herein.

The heat transfer element 621 is structured to accommodate the fracturing element 622, located on the side of the blood collection tube, and the fracturing movement 624 to the enable the fracturing element 625 to fracture the fracturable element 622 and initiate the chemical reaction between the one or more reagents (e.g., reagent A 651 and reagent B 652).

The heat transfer element 621 and insulation 631 are configured to accommodate the fracturable element 622 being located on the side of the blood collection tube.

Figure 7:
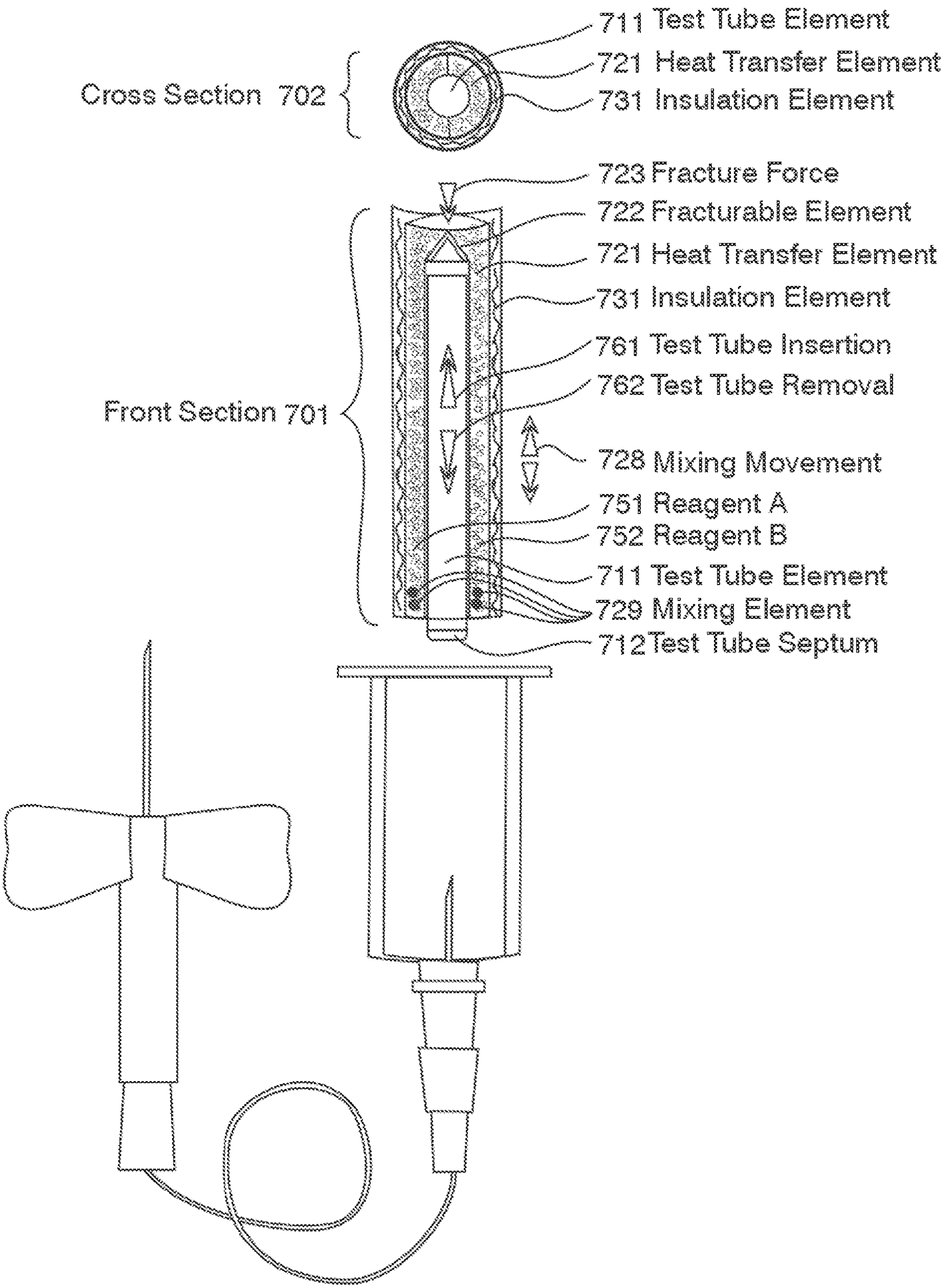
FIG. 7 is a front section view and a cross-section view of a blood collection tube comprising a test tube element, a heat transfer element, and an insulation element, wherein a mixing movement causes a mixing element to mix the reagents in the heat transfer element.

FIG. 7 is a front section view 701 and a cross section view 702 of a blood collection tube comprising a test tube element 711, test tube septum 712, heat transfer element 721, and an insulation element 731 wherein a fracturing force 723 is applied to fracture a fracturable element 722. A bidirectional mixing movement 728 enables a mixing element 729 to promote the mixing of the at least two reagents (e.g., reagent A 751 and reagent B 752) and initiate the chemical reaction.

Similar to the embodiment of FIG. 1, in the embodiment shown in FIG. 7, the fracturable element 722 is located at the bottom of the blood collection tube opposite the test tube septum 712 which is located on the top of the blood collection tube (the blood collection tube is illustrated upside down). In this embodiment, unintentional application of a fracture force 723 is inhibited by, for example, a curvature to that portion of the insulation element 731 to inhibit an unintended fracture of the fracturable element 722. The fracturable element 722 separates the reagents in the heat transfer element 721 until the fracturing of the fracturable element 722.

Similar to the embodiment of FIG. 3, advantageously in the embodiment shown in FIG. 7, the blood collection tube comprises a test tube element 711 that is removable from the blood collection tube. The test tube element 711 is inserted by, for example, a pushing or sliding force 761 into the heat transfer element 721. Similarly, the test tube element 711 is removed by, for example, a pulling or sliding force 762 away from the heat transfer element 721. In this embodiment, the structures of the test tube septum 712, heat transfer element 721, and insulation element 731 are configured to enable the removal of the test tube element 711 from the heat transfer element 721.

The test tube element 711, whether a general-purpose or specially adapted test tube element, is independent from the heat transfer element 721. The test tube element 711 is removable from the blood collection tube at any point in the blood collection and analysis process. Optionally, the test tube element 711 may be kept within the blood collection tube throughout the blood collection and analysis process.

Advantageously, as in the embodiment of FIG. 5, the embodiment of FIG. 7 further comprises an insulation element 731 encapsulating the heat transfer element 721.

Advantageously, FIG. 7 is drawn to illustrate the many potential advantageous synergistic combinations of elements that are available herein. Clearly, the particular elements, features, structures, or characteristics may be combined in a manner suitable to a particular requirement.

In an exemplary embodiment relating to FIG. 7 and the disclosure herein, a blood collection tube comprises: (i) a test tube element for storing blood extracted from a patient, the test tube element comprising a vacuum facilitating an extraction of blood from the patient, and further comprising a test tube septum, the test tube septum comprising an indicator of an endothermic capability of the blood collection tube; (ii) a heat transfer element encapsulating the test tube element and storing at least two reagents capable of initiating an endothermic process contemporaneously with the extraction of the blood from the patient, said endothermic process absorbing heat from the blood in the test tube element, the heat transfer element further comprising a fracturable element that when fractured enables the at least two reagents to initiate the endothermic process, the heat transfer element further comprising a mixing element whereby a bidirectional mixing movement enables the mixing element to promote the mixing of the at two or more reagents; and (iii) an insulation element encapsulating the heat transfer element, the insulation element inhibiting the loss of a temperature change of the blood resulting from the endothermic process initiated by the at least two reagents; wherein the insulation element does not interfere with a fracturing of the fracturable element; wherein the insulation element includes an insulator selected from the group consisting of a vacuum, rubber, plastic, acrylic, fiberglass, polyurethane, Styrofoam, cork, asbestos, thermoplastic, cellulose, polystyrene, wool, and thermal insulating material; wherein the combination of the insulation element, heat transfer element, and test tube element comprises a circumference suitable to be mated with a general-purpose test tube needle holder; and wherein the test tube element is removable from the heat transfer element contemporaneously with an initiation of a blood test.

In an alternative embodiment, the fracturable element is an ampoule. Disclosures of the use of an ampoule, which are incorporated herein by reference in their entirety, include U.S. Pat. No. 5,379,898A issued to Joulia on Jan. 10, 1995 which discloses a self-breakable ampoule designed for easy flow of the product contained in the ampoule.

The ampoule of the blood collection tube contains one or more reagents. The ampoule is located at any location within the heat transfer element. The ampoule is broken to release its contents into the surrounding reagent or reagents. The ampoule is broken by a force applied on the side of the blood collection tube or applied to the end of the blood collection tube opposite the test tube septum. Alternatively, the ampoule is broken by shaking of the blood collection tube or by a material within the heat transfer element. Optionally, the heat transfer element may contain multiple ampoules which need not be fractured simultaneously or contemporaneously. Such a multiple ampoule use in the heat transfer element would enable revitalizing the endothermic or exothermic process at a subsequently advantageous moment.

Figure 8:
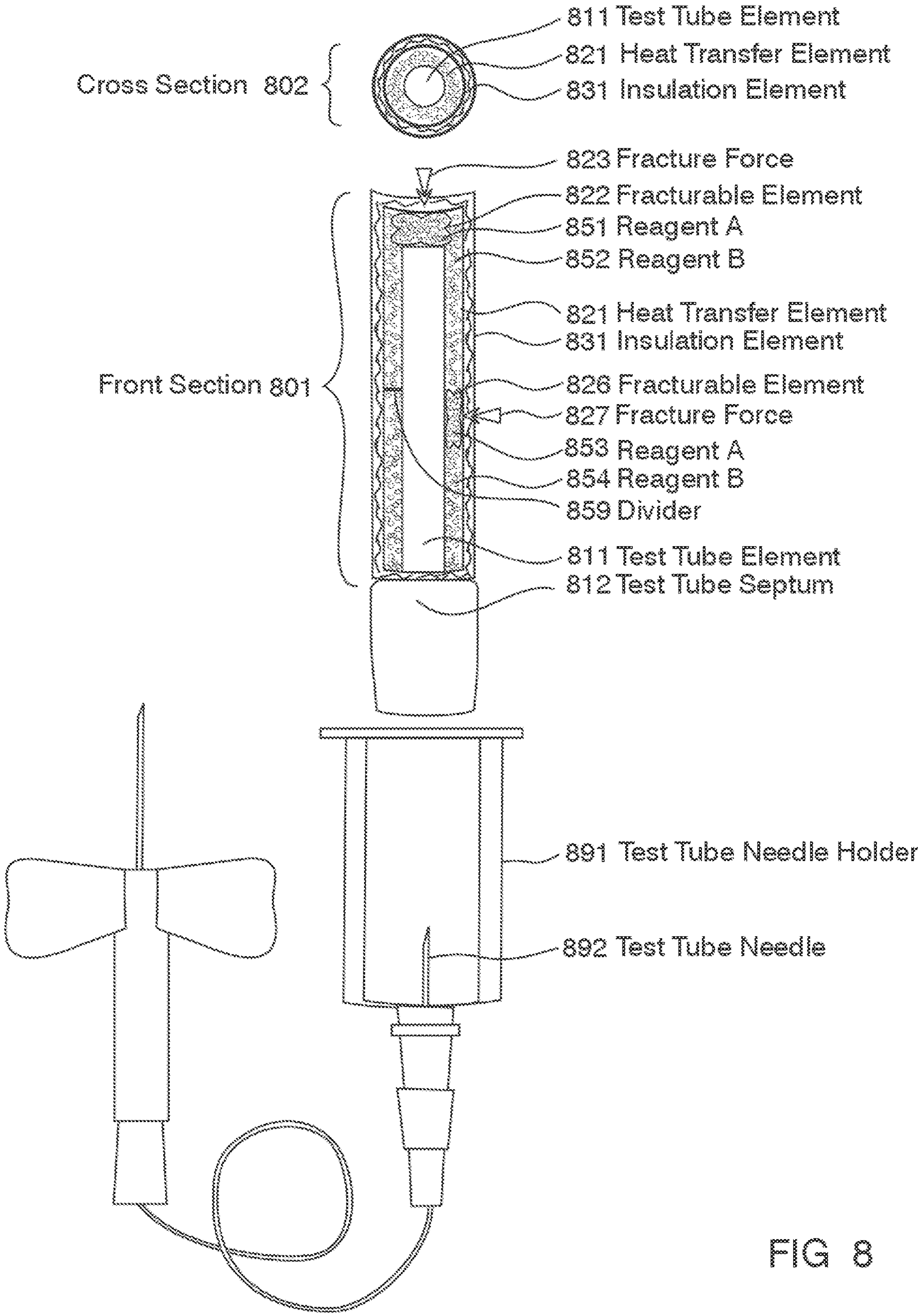
FIG. 8 is a front section view and a cross-section view of a blood collection tube comprising a test tube element, heat transfer element, and an insulation element, wherein the heat transfer element comprises a breakable ampoule containing at least one of the reagents.

FIG. 8 is a front section view 801 and a cross section view 802 of a blood collection tube comprising a test tube element 811, heat transfer element 821, and an insulation element 831. In this embodiment, the heat transfer element comprises a fracturable element that is a breakable ampoule 822 storing a least one reagent (e.g., reagent A 851). Outside of the ampoule 822, the heat transfer element 821 stores a least one other reagent (e.g., reagent B 852).

Similar to the embodiment of FIG. 7, in the embodiment shown in FIG. 8 the fracturable element (in this embodiment the ampoule 822) is located at the bottom of the blood collection tube opposite where the needle is inserted (the blood collection tube is illustrated upside down). In this embodiment, unintentional application of a fracture force 823 is inhibited by, for example, a curvature to that portion of the insulation element 831 to inhibit an unintended fracture of the ampoule 822. The ampoule 822 also separates the reagents (e.g., reagent A 851 and reagent B 852) in the heat transfer element 821 until the fracturing of the ampoule 822.

Optionally, the heat transfer element 821 is divided in at least two separately activated endothermic and exothermic zones by the use of for example, a second fracturable element (in this embodiment a second ampoule 826 also acting as a divider), and at least one heat transfer element divider 859. Within this zone created by the second fracturable element (in this embodiment a second ampoule 826) and the heat transfer element 821 divider 859, the ampoule 826 stores a least one reagent (e.g., in this illustration a second portion of reagent A 853), and the responsive zone of the heat transfer element 821 stores a least another reagent (e.g., in this illustration a second portion of reagent B 854).

Alternatively, or advantageously, the second ampoule 826 contains the same reagent as is contained in the ampoule 822. The heat transfer element 821 is not divided and the divider 859 is absent. Following the reaction between reagent B 852 and the reagent housed in the ampoule 822, unused reagent B 852 remains. Fracturing of the second ampoule 822 causes a reaction between the reagent housed in ampoule 822 and the remaining reagent B, prolonging the heat transfer of the heat transfer element 821.

Alternative embodiments implementing multiple heat transfer element 821 zones are not limited to: (i) the first fracturable element (e.g. a first ampoule 822) and a second fracturable element (e.g., the second ampoule 826) storing the same reagent (e.g., reagent A) or equivalent proportions of the same reagent; (ii) the combination of reagents in each zone producing the same chemical process; (iii) the fracture of the first ampoule 822 and the fracture second ampoule 826 occurring simultaneously or contemporaneously; and (iv) both chemical processes being an endothermic process or exothermic process. Optionally, an embodiment would find advantageous to combine separate endothermic and exothermic processes where, for example, an initial endothermic process is used to cool the blood and a subsequent exothermic process is used to warm the blood. In a non-simultaneous or non-contemporaneous initiation of the at least two chemical processes enabled by a responsive heat transfer element 821, a fracture force 823 would be applied to a first fracturable element 822 and at a subsequent time another fracture force 827 would be applied to a second fracturable element 826.

Advantageously, this embodiment further comprises an insulation element 831 that encapsulates the heat transfer element 821 and that provides an enhanced and more substantial level of insulation than what may or may not be provided by the perimeter of the heat transfer element 821. The insulation element 831 utilizes or is composed of an insulator comprising, for example, a vacuum, rubber, plastic, acrylic, fiberglass, polyurethane, Styrofoam, cork, asbestos, thermoplastic, cellulose, polystyrene, wool, or other thermal insulating material. The insulation element 831 may include a combination of or layers of a non-insulating material and/or an insulating material.

Optionally as is illustrated in FIG. 8, the insulation element 831 substantially completely encapsulates the heat transfer element 821 and the test tube element 811. In such an embodiment, the base of the blood collection tube that is inserted into, for example, the test tube needle 892 of the test tube needle holder 891 is responsive to the functional requirements of a test tube septum 812. In other words, the insulation materials utilized in at least the base would perform as is functionally required of a general-purpose test-tube septum.

In an exemplary embodiment relating to FIG. 8 and the disclosure herein, a blood collection tube comprises: (i) a test tube element for storing blood extracted from a patient, the test tube element comprising a vacuum facilitating an extraction of blood from the patient, and further comprising an indicator of an chemical process capability of the blood collection tube; (ii) a heat transfer element encapsulating the test tube element and including at least one breakable ampoule storing at least one reagent, the heat transfer element storing at least a second reagent that when combined with the first reagent is capable of initiating a chemical process contemporaneously with the extraction of the blood from the patient, the heat transfer element further comprising a mixing element whereby a bidirectional mixing movement enables the mixing element to promote the mixing of the at two or more reagents; and (iii) an insulation element substantially completely encapsulating the heat transfer element; wherein the insulation element does not interfere with a fracturing of the fracturable element; wherein a base of the blood collection tube is responsive to the functional requirements of a test tube septum; and wherein the combination of the insulation element, heat transfer element, and test tube element comprises a circumference suitable to be mated with a general-purpose test tube needle holder. Optionally, in the exemplary embodiment relating to FIG. 8 and the disclosure herein, the heat transfer element further includes at least a second breakable ampoule storing at least a second portion of the one reagent, the heat transfer element storing at least a second portion of the second reagent that when combined with the second portion of the first reagent is capable of initiating a chemical process subsequently to an initial initiation of a chemical process within the heat transfer element.

Figure 9:
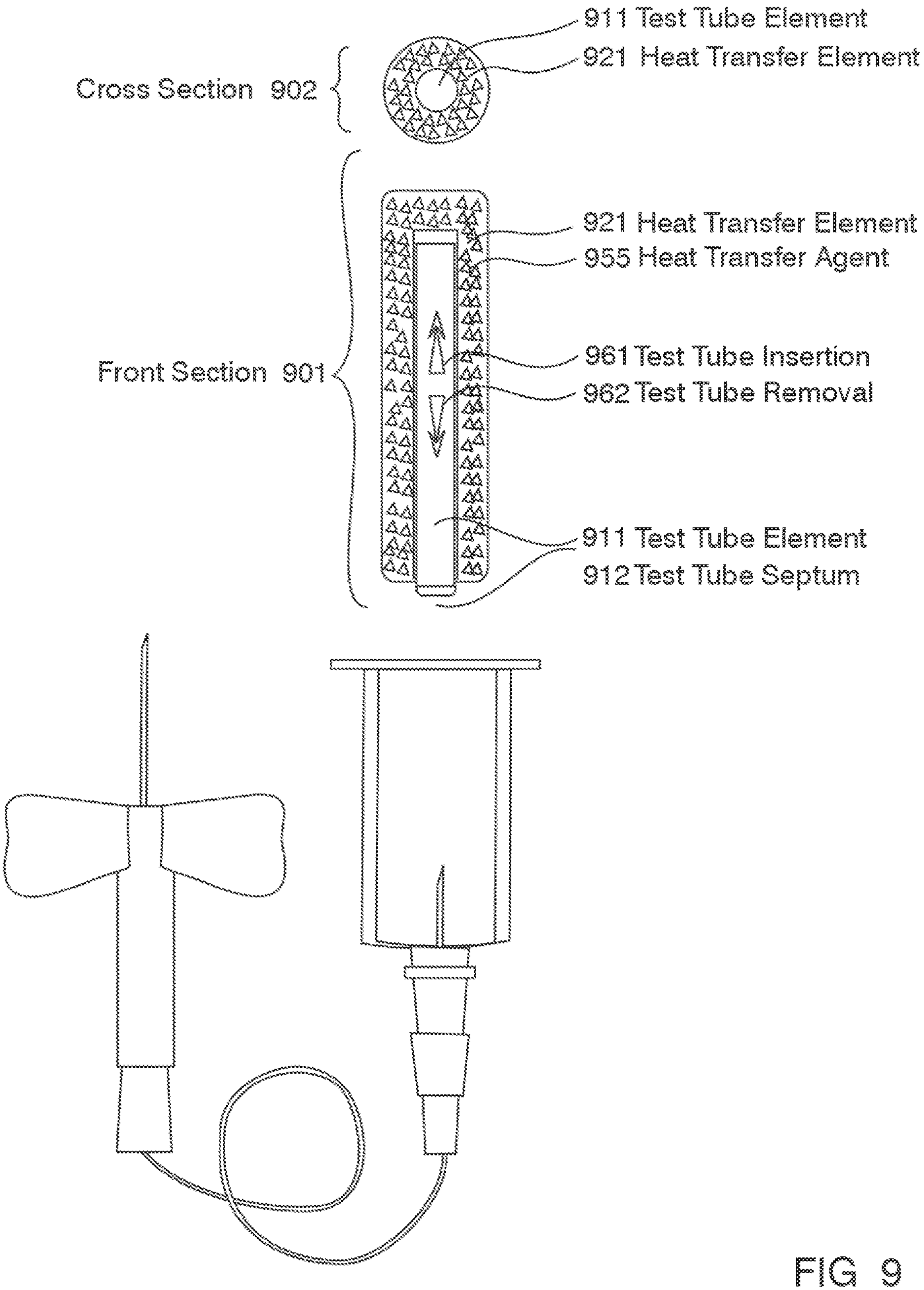
FIG. 9 is a front section view and a cross-section view of a blood collection tube comprising a test tube element and a heat transfer element, wherein the heat transfer element comprises a heat transfer agent.

FIG. 9 is a front section view 901 and a cross section view 902 of a blood collection tube comprising a test tube element 911, test tube septum 912, and a heat transfer element 921. The heat transfer element 921 comprising a heat transfer agent 955.

As opposed to other embodiments, the embodiment of FIG. 9 does not include insulation (e.g., insulation 131 FIG. 1) or an insulation element (e.g., insulation element 531 FIG. 5). However, other embodiments may include such insulation and/or insulation element.

Similar to the embodiment of FIG. 7, advantageously in the embodiment shown in FIG. 9, the blood collection tube comprises a test tube element 911 that is removable from the blood collection tube. The test tube element 911 is inserted by, for example, a pushing or sliding force 961 into the heat transfer element 921. Similarly, the test tube element 911 is removed by, for example, a pulling or sliding force 962 away from the heat transfer element 921. In this embodiment, the structures of the test tube septum 912, heat transfer element 921, and insulation element 931 are configured to enable the removal of the test tube element 911 from the heat transfer element 921.

The use of a heat transfer agent 955 in the heat transfer element 921 in synergistic combination with a removable test tube element 911 has the advantage of a potential reusability of the portion of the blood collection tube comprising the heat transfer element 921 and the insulation element 931. In such an embodiment, for example, following an initial use and removal of the utilized test tube, at least the heat transfer element 921 and the insulation element 931 would be subjected to the required cooling or heating of the heat transfer element 921 and stored for subsequent utilization with a new test tube element 911.

Reference throughout this specification to “one embodiment” or “an embodiment” means that a particular element, feature, structure, or characteristic described in connection with the embodiment is included in at least one embodiment. Thus, appearances of the phrases “in one embodiment” or “in an embodiment” in various places throughout this specification are not necessarily all referring to the same embodiment.

The previous description is provided to enable any person skilled in the art to practice the various aspects described herein. Various modifications to these aspects will be readily apparent to those skilled in the art, and the generic principles defined herein may be applied to other aspects.

In an exemplary embodiment relating to FIG. 9 and the disclosure herein, a blood collection tube comprises: (i) a test tube element for storing blood extracted from a patient, the test tube element being a general-purpose test tube comprising a vacuum facilitating an extraction of blood from the patient, and further comprising a test tube septum, the test tube septum comprising an indicator of an endothermic capability of the blood collection tube; and (ii) a heat transfer element encapsulating the test tube element and storing a heat transfer agent capable of transferring heat to blood contemporaneously with the extraction of the blood from the patient; and wherein the combination of heat transfer element, and test tube element comprises a circumference suitable to be mated with a general-purpose test tube needle holder; and wherein the test tube element is removable from the heat transfer element contemporaneously with an initiation of a blood test.

Certain blood samples need to be protected from ultraviolet light. In some embodiments, the test tube element is comprised of an ultraviolet light blocking material. In some embodiments, the test tube element is surrounded by an ultraviolet light blocking material.

The blood collection tube has a test tube septum. The test tube septum covers or seals the opening of a test tube element and which may be puncturable.

Conventionally, test tubes are sealed with a test tube septum and often have a specific additive placed in the tube with the test tube septum color indicating the additive. For example, a blue-top tube is a 5 ml test tube containing sodium citrate as an anticoagulant.

Advantageously, the various embodiments disclosed herein comprise a blood collection tube that may be used in conjunction with a specifically adapted device or general-purpose devices such as a vacutainer hub, vacutainer holder, syringe, and other blood draw devices. Such general-purpose devices conventionally comprise a test tube needle holder, test tube needle, butterfly, and butterfly needle. The size of conventional vacutainer hubs, vacutainer needle holders, and syringes need not need to be changed to accommodate the blood collection tube. In the case of a specifically adapted device or a special-purpose device, such devices are responsive to the dimensional requirements of the blood collection tube.

The blood collection tube is also specially adapted to be used in conjunction with centrifuges and blood processing equipment. Centrifuge adapters can be made to accommodate the blood collection tube. Examples of commercially available test tube needle holders include the BD Vacutainer One-Use Holder, The BD Vacutainer One-Use Needle Holder, and the Vacutainer Hub, the teachings of which are incorporated herein by reference.

In fluid dynamics, the movement of liquid inside another object is known as slosh. Sloshing occurs when the liquid has a free surface. Examples of free surfaces include the interface between two homogenous liquids and the interface between liquid water and air in the Earth's atmosphere. If a container is completely filled by a fluid and lacks a free surface, sloshing does not occur.

Advantageously and innovatively, in the various embodiments disclosed herein, the blood collection tube comprises a mechanism for reducing the sloshing of blood within a test tube.

In some embodiments, the blood collection tube comprises a baffle element. The baffle element is a form of structure, material, or matter that has the ability to decrease liquid sloshing such as a slosh baffle of various shapes and sizes, a sponge, or a curved tube through which fluid can flow. In some embodiments, the baffle element is comprised of a foam. In some embodiments, the baffle element is movable. In other embodiments, the baffle element is fixed. Variations of the baffle element include but are not limited to one or more baffle rings, one or more conical baffles, one or more radial baffles, one or more sectored baffles, or one or more z-ring conical sectioned baffles, an annular shaped test tube, one or more floating cans, and one or more floating lid devices.

In some embodiments, the baffle element is not attached to the interior surface of the test tube and instead is incorporated into the walls of the test tube. In some embodiments, the test tube is a baffle element. In an alternative embodiment, the blood collection tube contains multiple baffle elements. Examples of baffles which are incorporated herein by reference U.S. Pat. No. 6,220,287B1 issued to Wolf on Apr. 24, 2001 which discloses a baffle for suppressing slosh in a tank, and U.S. Pat. No. 5,779,092 issued to Hehn on Jul. 14, 1998 which discloses a baffle system for a tank are incorporated herein by reference.

Figure 10:
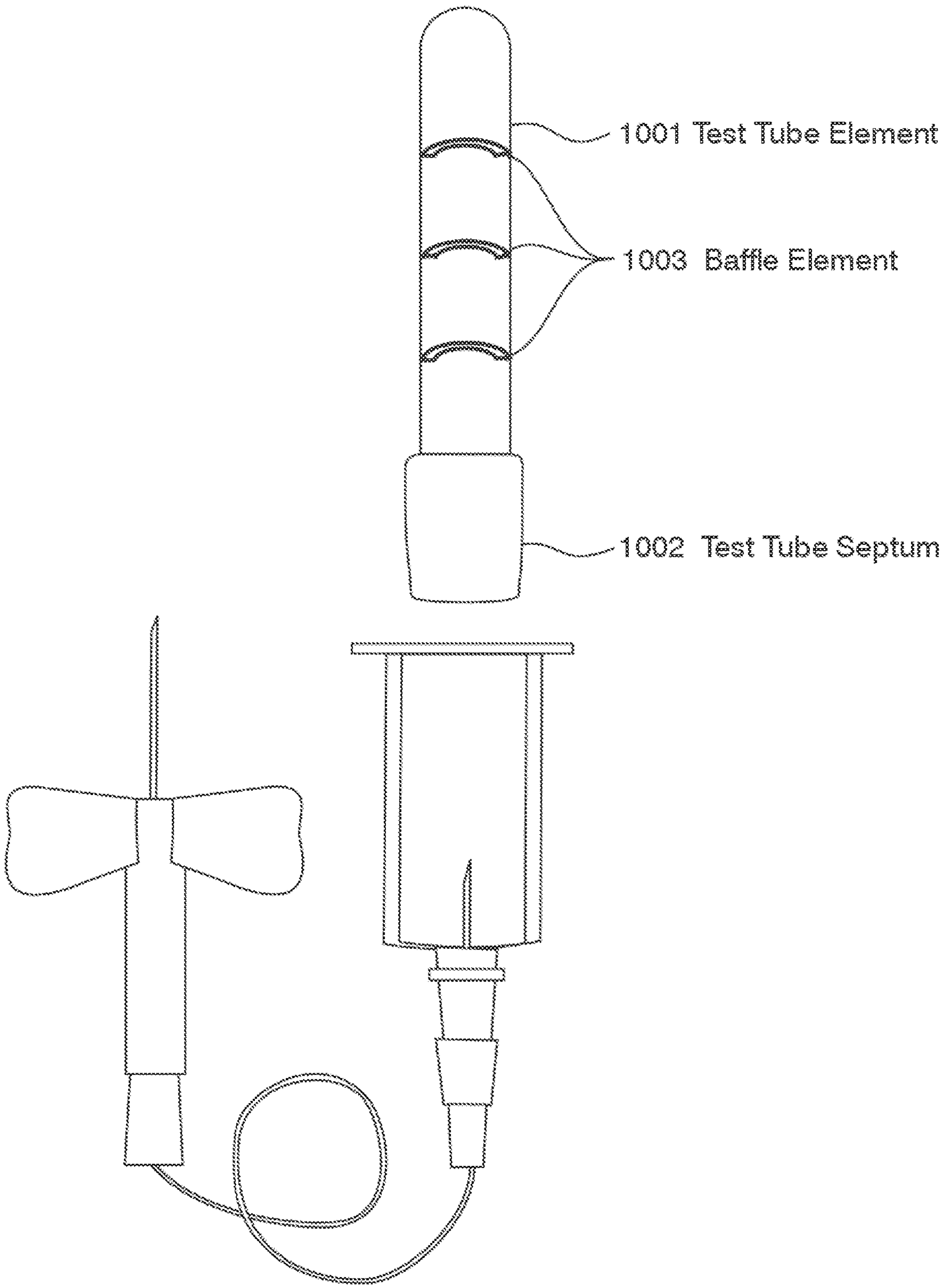
FIG. 10 is a front section view of a blood collection tube, the apparatus comprising a test tube element, a test tube septum, and a baffle element.

FIG. 10 is a front section view of a blood collection tube embodiment comprising a test tube element 1001 and a test tube septum 1002. The test tube septum 1002 covers the opening of the test tube element 1001 and maintains the vacuum within the test tube element 1001. The test tube element 1001 is vacuum sealed to assist with drawing blood into the tube. The test tube septum 1002 and test tube element 1001 are attached by the use of an adhesive such as cyanoacrylate glue, acrylic, silicone, urethane, and UV light curing technologies. Advantageously, the test tube element 1001 contains one or multiple additives to alter or improve the general quality or to counteract undesirable properties in the blood sample in a manner that is responsive to the contemplated blood test.

The blood collection tube of FIG. 10 further comprises a baffle element 1003. The baffle element 1003 is located within or adjacent to the test tube element 1001. The baffle element 1003 decreases the liquid motion or slosh of the blood contained within the test tube element 1001. The baffle element 1003 is attached to the inner aspect of the test tube element 1001 by a form of adhesion such as cyanoacrylate glue, acrylic, silicone, urethane, and UV light curing technologies. In some embodiments, the test tube element 1001 comprises or is adjacent to a temperature-altering mechanism.

In an exemplary embodiment, the test tube element 1001 is 20 mm in diameter and 100 mm in length. The baffle element 1003 is comprised of three concentric rings with an outer diameter equal to that of the inner portion of the test tube element 1001 and an inner diameter of 8 mm. The baffle element 1003 is composed of glass. The test tube element 1001 is composed of glass. The test tube septum 1002 is composed of rubber.

In an exemplary embodiment relating to FIG. 10 and the disclosure herein, a blood collection tube comprises: (i) a test tube element for storing blood extracted from a patient, the test tube element comprising a vacuum facilitating an extraction of the blood from the patient, and further comprising a test tube septum; (ii) a baffle element within the test tube element, the baffle element dampening the slosh of the blood extracted from a patient, wherein the slosh of the blood extracted from the patient is dampened after the blood has been collected into the test tube element.

In an alternative embodiment, one or more aspects of FIG. 10 can be eliminated or duplicated. In an alternative embodiment, one or more aspects of FIG. 10 can be connected or associated with its adjacent elements in a different manner, made integrally or separately, or given a different mode of operation. For example, the baffle element is movable within the test tube, and wherein the shape of the baffle element is selected from the group consisting of a cone, a cross, and a circle.

In some embodiments, the blood collection tube contains a space-occupying element. The space-occupying element is a material, apparatus, structure, mechanism or other form of matter that decreases the space within the test tube that is not occupied by blood, and thus decreases the sloshing of the fluid within the tube. In some embodiments, the space-occupying element expands upon interaction with fluid, examples of which include a sponge that absorbs blood and a material encased within a water-soluble polymer which expands once the encasing material dissolves. In some embodiments, the space-occupying element expands or moves to fill the space by direct activation by the user. In some embodiments, the test tube septum is moved into the blood collection element to occupy space not occupied by blood within the tube. In some embodiments, the space-occupying element compresses the blood and changes the pressure within the tube. For example, in some embodiments, the space-occupying element compresses the red blood cells within the blood. Disclosures of the use of a mechanism to occupy space, which are incorporated herein by reference in their entirety, include U.S. Pat. No. 3,825,013 issued to Craven on Jul. 23, 1974 which discloses an inflatable balloon catheter, and U.S. Pat. No. 4,881,915 issued to Liaw on Nov. 21, 1989 which discloses a compressed sponge that expands with exposure to water.

In some embodiments, the space-occupying element decreases or removes the free surface of the fluid within the test tube by placing a material against the blood. Advantageously, some embodiments of the space-occupying element comprise a structure with a diameter equivalent to the diameter of the circular interior of the test tube. The structure with a diameter equivalent to the diameter of the circular interior of the test tube moves towards the blood and minimizes the free surface of the blood. In some embodiments, the space-occupying element utilizes a twisting, pushing, or other mechanism to move the structure towards the blood.

In some embodiments, the space-occupying element can be moved by the use of a winding gear. Disclosure of the use of a winding gear, which is incorporated herein by reference in its entirety, includes U.S. Pat. No. 3,610,369 issued to Rodgers on Oct. 5, 1971 which discloses a winding mechanism for a spring-driven device.

Figure 11:
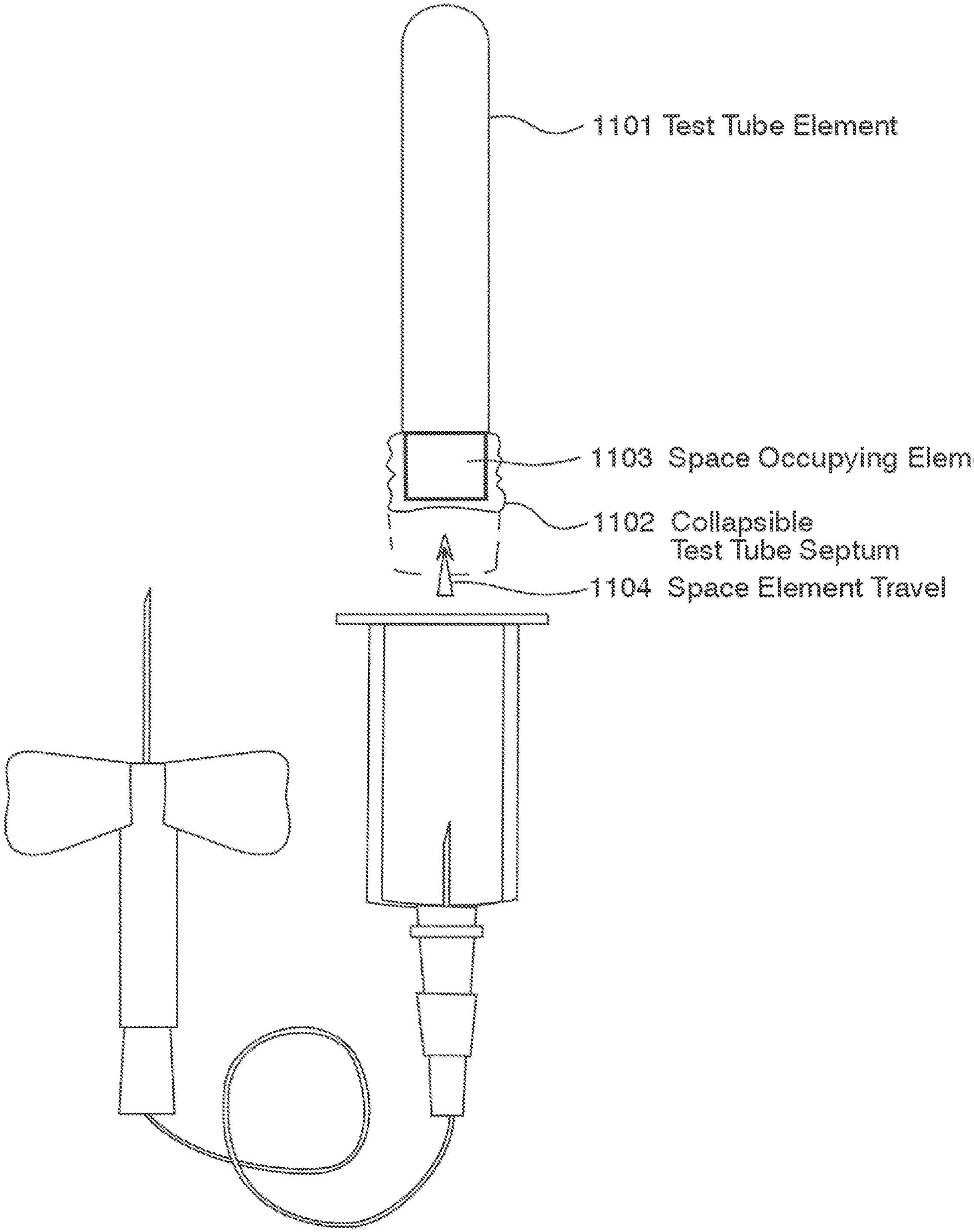
FIG. 11 is a front section view of a blood collection tube comprising a test tube element, a test tube septum, and a space-occupying element, wherein the space in the test tube element not occupied by blood is decreased.

FIG. 11 is a front section view of a blood collection tube embodiment comprising a test tube element 1101 and a collapsible test tube septum 1102. The test tube element 1101 is vacuum-sealed to assist with drawing blood into the tube. The collapsible test tube septum 1102 covers the opening of the test tube element 1101 and maintains the vacuum within the test tube element 1101. Advantageously, the test tube element 1101 contains one or multiple additives to alter or improve the general quality or to counteract undesirable properties in the blood sample in a manner that is responsive to the contemplated blood test.

The blood collection tube of FIG. 11 further comprises a space-occupying element 1103. The space-occupying element 1103 is moveable or fixed within the test tube element 1101, collapsible test tube septum 1102, or both. The space-occupying element 1103 decreases the space within the test tube element 1101 not occupied by blood. The embodiment depicted by FIG. 11 comprises a collapsible test tube septum 1102 with a space-occupying element 1102 incorporated within its structure. If held upright in the manner illustrated by FIG. 11, the user of the blood collection tube moves the space-occupying element 1103 toward the blood within the test tube element 1101 and thereby decreases the space unfilled by blood within the test tube element 1101. The space-occupying element 1103 will be effective regardless of the position of the blood collection tube. In some embodiments, the space-occupying element 1103 is comprised of a structure connecting the test tube septum to a disc equal in diameter to the interior diameter of the test tube element. In some embodiments, the space-occupying element 1103 moves towards the blood by use of a mechanism on the exterior portion of the collapsible test tube septum 1102, such as by a winding a gear. The space element travel 1104 designates the direction of motion of the space-occupying element 1103.

In some embodiments, the test tube element 1101 comprises or is adjacent to a temperature-altering mechanism. In some embodiments, the test tube element 1101 may comprise a material providing friction to reduce the spinning motion of the blood.

In an example embodiment, the test tube element 1101 is 20 mm in diameter and 100 mm in length. The test tube element 1101 is composed of plastic. The collapsible test tube septum 1102 is composed of rubber. The space-occupying element 1103 is an aspect of the collapsible test tube septum 1102 which can be pushed towards the bottom of the test tube element 1101. The space-occupying element 1103 extends a maximum of 40 mm into the test tube element 1101, towards the bottom of the test tube element 1101.

In an exemplary embodiment relating to FIG. 11 and the disclosure herein, a blood collection tube comprises: (i) a test tube element for storing blood extracted from a patient, the test tube element comprising a vacuum facilitating an extraction of the blood from the patient, and further comprising a test tube septum; (ii) a space-occupying element incorporated into the test tube septum, wherein the space-occupying element occupies a space unoccupied by blood extracted from the patient within the test tube septum.

In an alternative embodiment, one or more aspects of FIG. 11 can be eliminated or duplicated. In an alternative embodiment, one or more aspects of FIG. 11 can be connected or associated with its adjacent elements in a different manner, made integrally or separately, or given a different mode of operation.

Dissolvable films are composed of water-soluble polymers that dissolve when exposed to water. Dissolvable films are comprised of water-soluble polymers such as polyvinyl alcohol hydroxylpropyl-methylcellulose, polyvinylpyrrolidone, polyvinyl-alcohol, carboxymethyl-cellulose, polyethylene-oxide, hydroxylpropyl-cellulose, hydroxylethyl-cellulose, methylcellulose, pullulan, gelatin, pectin, sodium alginate, maltodextrin, polymerized rosin, and xanthan. In healthcare, as well as other areas, dissolvable films are used to encase substances or materials. The thickness of dissolvable films alters the amount of time the film needs to be exposed to water before dissolving. The molecular weight and degree of hydrolysis of the dissolvable film can be altered to change the solubility of the film. The article titled "Dissolvable Polyvinyl-Alcohol Film, a Time-Barrier to Modulate Sample Flow in a 3D-Printed Holder for Capillary Flow Paper Diagnostics" published in Materials (Basel) and made available online Jan. 22, 2019 provides an excellent review of modifying aspects of a dissolvable film and is incorporated herein in its entirety and is further exemplary of the knowledge available to a person of ordinary skill in the art.

In some embodiments, the blood collection tube comprises an additive ratio element. In some embodiments, the additive ratio element comprises additive encased by a dissolvable film. Exemplary to the knowledge available to a water-soluble film that is inert with respect to blood and blood testing reagents within a test tube and incorporated herein by reference is U.S. Pat. No. 4,153,739 issued to Kessler on May 8, 1979 which discloses a method of maintaining the blood clot-activating properties of a siliceous surface in a blood collecting assembly. In some embodiments, the additive ratio element is dispersed so that a predetermined amount of additive will interact with blood depending on the volume of blood in the tube. In some embodiments, the the dissolvable film at the top of the test tube will be thicker than the dissolvable film at the bottom of the test tube. In some embodiments, the dissolvable film will have different properties in different areas of the test tube.

In some embodiments, the blood collection tube will comprise an additive blocking element. After blood is drawn from the patient, the additive blocking element moves towards the bottom of the test tube and covers the inner walls of a portion of the test tube. The additive blocking element prevents the interaction between the blood and the additive blocked by the additive blocking element.

The space-occupying element can be moved by the use of a winding gear. Disclosure of the use of a winding gear, which is incorporated herein by reference in its entirety, includes U.S. Pat. No. 3,610,369 issued to Rodgers on Oct. 5, 1971 which discloses a winding mechanism for a spring-driven device.

Figure 12:
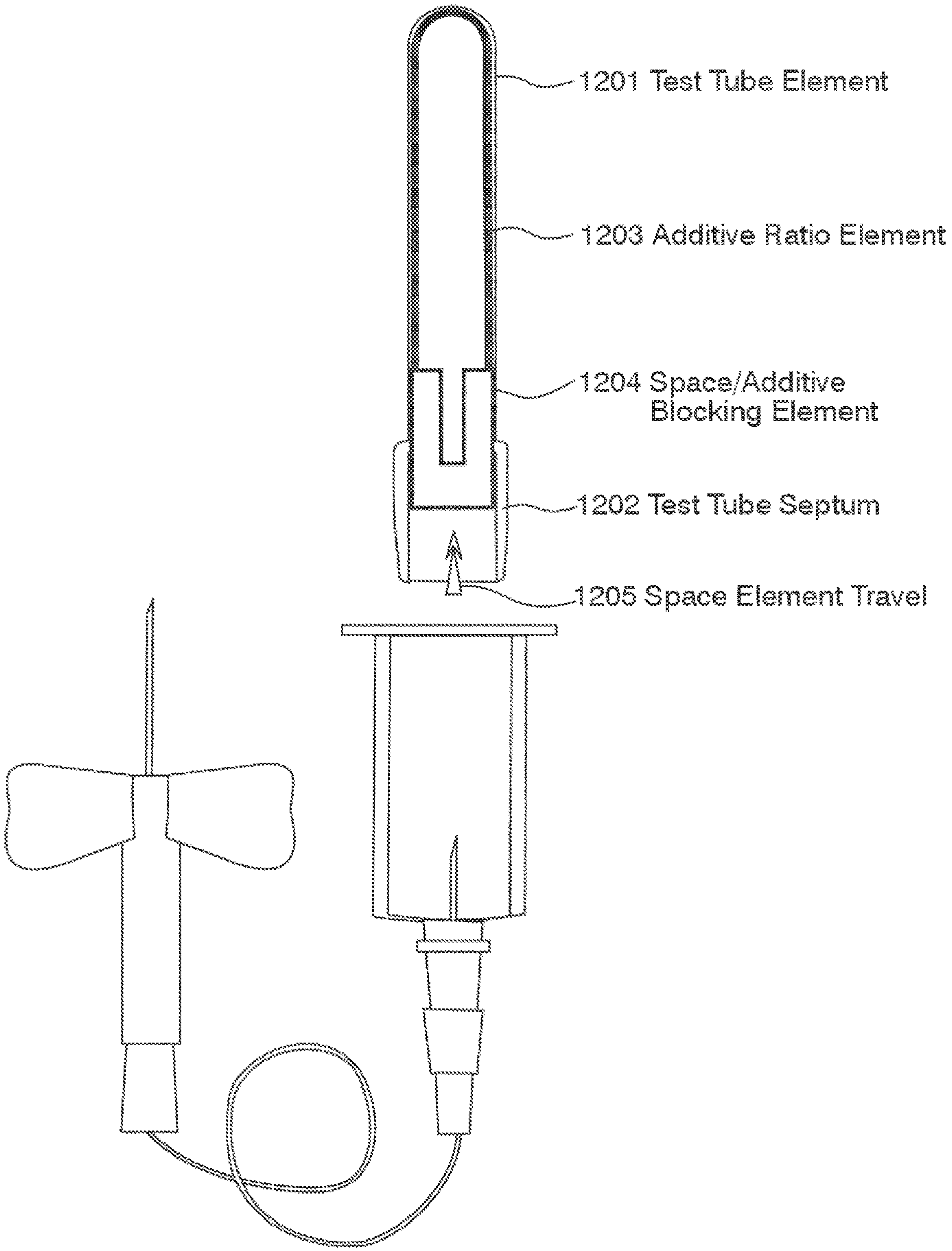
FIG. 12 is a front section view of a blood collection tube comprising a test tube element, a test tube septum, an additive ratio element, and an additive blocking element.

FIG. 12 is a front section view of a blood collection tube comprising a test tube element 1201, a test tube septum 1202, an additive ratio element 1203, and a space/additive blocking element 1204. The test tube element 1201 is vacuum sealed to assist with drawing blood into the tube. The test tube septum 1202 covers the opening of the test tube element 1201 and maintains the vacuum within the test tube element 1201. Advantageously, the test tube element 1201 contains one or multiple additives to alter or improve the general quality or to counteract undesirable properties in the blood sample in a manner that is responsive to the contemplated blood test.

The blood collection tube of FIG. 12 further comprises an additive ratio element 1203. The additive ratio element 1203 comprises additive encased by a dissolvable film dispersed in a predetermined fashion along the inner walls of the test tube element 1201. In some embodiments, the additive is dispersed evenly along the inner walls of the test tube element. In some embodiments, the additive is dispersed unevenly along the inner walls of the test tube element. Advantageously, the additive is dispersed along the inner walls of the test tube element 1201 so that the ratio of additive to blood is maintained as the volume of blood increases within the test tube. The thickness of the additive ratio element 1203 can be changed. The thickness of the additive ratio element 1203 can be different in different areas of the test tube element 1201. The molecular weight and degree of hydrolyzation of the dissolvable film of the additive ratio element 1203 can be altered. In some embodiments, the dissolvable film is vacuum-sealed against the additive and attached to the walls of the test tube element 1201 with acrylic or another form of adhesive. The molecular weight and degree of hydrolyzation of the dissolvable film of the additive ratio element 1203 can be different in different areas of the test tube element 1201. The composition and amount of additive in the additive ratio element 1203 can be altered. The composition and amount of additive in the additive ratio element 1203 can be different in different areas of the test tube element 1201.

The blood collection tube of FIG. 12 further comprises a space/additive blocking element 1204. After blood is drawn from the patient, the space/additive blocking element 1204 moves towards the bottom of the test tube and covers the inner walls of the top portion of the test tube. The space/additive blocking element 1204 prevents the interaction between the blood and the additive blocked by the space/additive blocking element 1204. In some embodiments, the space/additive blocking element 1204 meets the free surface of the blood within the test tube element 1201 and blocks the interaction between the blood and the additive on the upper portion of the test tube element 1201. The space/additive blocking element 1204 comprises an outer portion that prevents the interaction between the blood and the additive. The space/additive blocking element 1204 also comprises an inner portion with a shorter length that occupies space unoccupied by blood within the test tube element 1201. In some embodiments, the space/additive blocking element 1204 is not present. In some embodiments, the space/additive blocking element is a structure without differing dimensions of its inner and outer aspects. In some embodiments, another structure or mechanism prevents additive from interacting with blood. In an exemplary embodiment, the additive ratio element 1203 prevents the additive to blood ratio from being altered significantly enough to invalidate blood analyses.

In an example embodiment, the test tube is 20 mm in diameter and 100 mm in length. The additive ratio element 1203 is comprised of a dissolvable film of polyvinyl alcohol and deionized water encasing an EDTA additive. The additive ratio element 1203 from the bottom of the test tube to a height of 80 mm is composed of a dissolvable film made of polyvinyl alcohol that has a molecular weight of 30-70 K and is 87-90% hydrolyzed. The dissolvable film is encasing EDTA spread evenly on the inner surfaces of the test tube element 1201. The dissolvable film is vacuum sealed against the EDTA additive. The dissolvable film is attached to the test tube element 1201 by adhesion using cyanoacrylate. The additive ratio element 1203 from the height of 80 mm of the test tube to the test tube septum 1202 at 100 mm in height is composed of a dissolvable film made of polyvinyl alcohol that has a lower molecular weight than 30-70 K and a greater degree of hydrolysis than 87-90%, increasing the amount of time the film takes to dissolve in the presence of blood. The space/additive blocking element 1204 is comprised of rubber and moves 20 mm towards the bottom of the test tube element 1201 when pushed by the user. The space/additive blocking element 1204 utilizes the mechanism disclosed in World Patent Application No. WO2015193519A1. The space/additive blocking element 1204 blocks the blood from dissolving the dissolvable film of the additive ratio element 1203 in the area that it covers. Space element travel 1205 demonstrates the direction of movement of the test tube septum 1202 and/or the space additive blocking element 1204.

In an exemplary embodiment relating to FIG. 12 and the disclosure herein, a blood collection tube comprises: (i) a test tube element for storing blood extracted from a patient, the test tube element comprising a vacuum facilitating an extraction of the blood from the patient, and further comprising a test tube septum; (ii) a additive ratio element, wherein a additive within the test tube element is encased by a soluble film, wherein exposure of the soluble film to the blood extracted from the patient dissolves the soluble film, wherein the additive is only available to react with the blood extracted from a patient after the soluble film has been dissolved; (iii) a additive blocking element, wherein the additive blocking element is incorporated into the test tube septum, wherein the additive blocking element blocks the blood extracted from the patient from dissolving a portion of the soluble film, wherein the additive blocking element eliminates the free surface of the blood extracted from a patient, wherein the additive blocking element limits the sloshing of the blood extracted from a patient.

In an alternative embodiment, one or more aspects of FIG. 12 can be eliminated or duplicated. In an alternative embodiment, one or more aspects of FIG. 12 can be connected or associated with its adjacent elements in a different manner, made integrally or separately, or given a different mode of operation.

Figure 13:
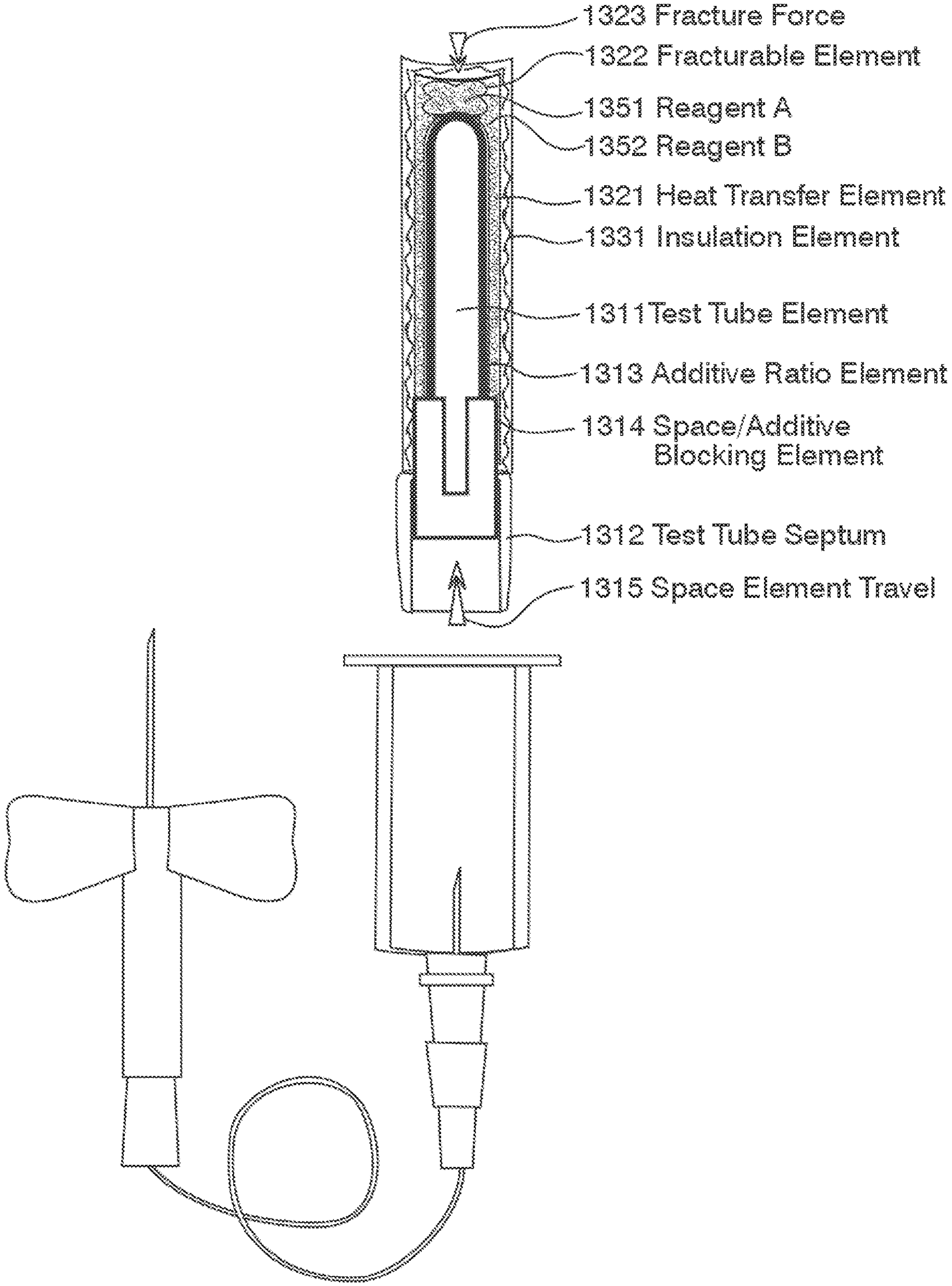
FIG. 13 is a front section view of a blood collection tube comprising a test tube element, a test tube septum, an additive ratio element, a space/additive blocking element, space element travel, an insulation element, a heat transfer element, reagent A, reagent B, a fracturable element, and a fracture force.

FIG. 13 is a front section view of a blood collection tube comprising a test tube element 1311, a test tube septum 1312, an additive ratio element 1313, a space/additive blocking element 1314, space element travel 1315, an insulation element 1331, a heat transfer element 1321, reagent A 1351, reagent B 1352, a fracturable element 1322, and a fracture force 1323.

Accordingly, in a exemplary embodiment, a blood collection apparatus comprises: a test tube element for storing blood extracted from a patient, the test tube element comprising a vacuum facilitating an extraction of the blood, and comprising a test tube septum; an additive, within the test tube element, and beings encased by a soluble film, wherein exposure of the soluble film to the extracted blood dissolves the soluble film, whereby the additive is only available to react with the blood extracted from a patient after the soluble film has been dissolved; and an additive blocking element incorporated into the test tube septum, wherein the additive blocking element blocks the extracted blood from dissolving a portion of the soluble film and thereby limiting the amount of additive applied to the extracted blood, limiting the free surface of the blood thereby limiting the sloshing of the extracted blood within the test tube. blood collection apparatus further comprising an insulation element, a heat transfer element comprising at least two reagents, and a fracturable element.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

The teachings disclosed herein, directly and indirectly by, for example, incorporation, are intended to show a variety of inventive elements and features which are combined and may be combined to suit particular embodiments. While a function of incorporation is to provide additional detail explanation, the synergies among and between the various inventive elements is a significant feature of and object of incorporation. The incorporation by reference at a specific place within the specification is not intended to limit the extent to which the reference is incorporated, or the manner in which it may be integrated. Where a teaching may be deemed to be at cross purposes, or otherwise incompatible, with some other teaching, it ought to be understood as a possible alternative to be utilized as a particular preferred embodiment may require.

While elements of the inventions have been detailed in conjunction with specific embodiments thereof, it is evident that many alternative permutations in the combination elements and features are possible, and additional modifications and variations are possible and will be apparent to those skilled in the art in light of the foregoing descriptions. Accordingly, it is intended to embrace all such permutations, alternatives, modifications, variations, and combinations as fall within the spirit and broad scope of the specification. The teachings that have been cited and incorporated herein are offered by way of example, and not limitation, of the underlying foundation of knowledge and skill that is available to a person of ordinary skill in the art. Many of the features, components, and methods found in the art may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. A blood collection apparatus comprising:

a test tube element for storing blood extracted from a patient, the test tube element comprising a vacuum facilitating an extraction of the blood, and comprising a test tube septum;

an anticoagulate additive, within the test tube element, and being encased by a soluble film provided on an inner wall of the test tube element, wherein exposure of the soluble film to extracted blood dissolves the soluble film, causing the anticoagulate additive to become available to react with the blood extracted from a patient after the soluble film has been dissolved; and an additive blocking element incorporated into the test tube septum, wherein the additive blocking element is a continuous cylindrical solid with a uniform outer diameter along an entire length thereof and a recessed portion on an end thereof, the additive blocking element is moveable by a user from the test tube septum towards the extracted blood within the test tube element, wherein the additive blocking element contacts the soluble film on the inner wall of the test tube element and blocks the extracted blood from dissolving a portion of the soluble film thereby limiting the amount of additive applied to the extracted blood, limiting the free surface of the blood, and thereby limiting the sloshing of the extracted blood within the test tube.

2. The blood collection apparatus of claim 1, wherein the soluble film comprises a material selected from a group consisting of polyvinyl alcohol, cellulose, poly(ethylene oxide), polyvinylpyrrolidone, polyacrylamides, and polyacrylic acid copolymer.

3. The blood collection apparatus of claim 1, wherein a molecular weight and a degree of hydrolysis of the soluble film is effected based on the encased additive.

4. The blood collection apparatus of claim 1, wherein the additive and soluble film are dispersed evenly along an inner wall surface of the test tube element.

5. The blood collection apparatus of claim 1, wherein the test tube element of the blood collection apparatus further comprises a circumference that allows the test tube element to be mated with a general-purpose device selected from the group consisting of a general-purpose test tube needle holder and a general-purpose syringe.

6. The blood collection apparatus of claim 1, wherein the blood collection apparatus further comprises an insulation element, a heat transfer element comprising at least two reagents, and a fracturable element.

7. The blood collection apparatus of claim 1, wherein the recessed portion of the additive blocking element is on an end of the blocking element that faces a bottom of the test tube element.

* * * * *